United States Patent [19]

Daimon et al.

[11] Patent Number: 5,302,479
[45] Date of Patent: Apr. 12, 1994

[54] CRYSTALS OF HYDROXYGALLIUM PHTHALOCYANINE, METHOD OF PREPARING THE CRYSTALS, PHOTOCONDUCTIVE MATERIAL COMPRISING THE CRYSTALS, AND ELECTROPHOTOGRAPHIC PHOTORECEPTOR COMPRISING THE MATERIAL

[75] Inventors: Katsumi Daimon; Katsumi Nukada; Akira Imai; Masakazu Iijima; Kazuo Yamasaki; Kiyokazu Mashimo; Yasuo Sakaguchi; Toru Ishii, all of Kanagawa, Japan

[73] Assignee: Fuji Xerox Co., Ltd., Tokyo, Japan

[21] Appl. No.: 873,026

[22] Filed: Apr. 24, 1992

[30] Foreign Application Priority Data

Apr. 26, 1991 [JP] Japan .................................. 3-122812
Jan. 20, 1992 [JP] Japan .................................. 4-27450
Apr. 13, 1992 [JP] Japan .................................. 4-118524

[51] Int. Cl.$^5$ ..................... G03G 5/00; G03G 15/00
[52] U.S. Cl. ..................................... 430/78; 430/56
[58] Field of Search .................................. 430/56, 78

[56] References Cited

U.S. PATENT DOCUMENTS 2,770,029 11/1956 Ueltz .
3,160,635 12/1964 Knudsen et al. .
3,357,989 12/1967 Byrne et al. .
3,708,292 1/1973 Brach et al. .

FOREIGN PATENT DOCUMENTS 48-34189   5/1973  Japan .
49-105536 10/1973  Japan .
50-38543   4/1975  Japan .
57-148745  9/1982  Japan .
58-21414   2/1983  Japan .
59-44053   3/1984  Japan .
61-151659  7/1986  Japan .
1-221459   9/1989  Japan .

OTHER PUBLICATIONS

*Bull. Soc. Chim. France,* (1962): 23–26.
*Journal of Imaging Science,* 29, No. 1 (Jan./Feb. 1985): 7–10.
*Zeitschrift fur anorganische und allgemeine Chemie,* 354, No. 1-2 (Sep. 1967): 1–9.
Tanaka et al.; "Photoconduction of Metal Phthalocyanine (III)–Rectification Properties of Gallium Phthalocyanine"; Denshishashin Gakkaishi, vol. 26(3), (1987); pp. 240–244.
Arishima et al.; "Electrophotographic Photoreceptors with High Sensitivity in Near Infrared Region Using Phthalocyanine Compounds"; Shinkyo Gihoh CPM-8-1-69, (1981); pp. 39–45.

*Primary Examiner*—John Kight, III
*Assistant Examiner*—T. Mosley
*Attorney, Agent, or Firm*—Oliff & Berridge

[57] ABSTRACT

Crystals of hydroxygallium phthalocyanine, a method of preparing the crystals, a photoconductive material containing the crystals, and an electrophotographic photoreceptor having the material. The photoreceptor has excellent electrophotographic characteristics. The crystals of hydroxygallium phthalocyanine have distinct diffraction peaks at (i) 7.5°, 9.9°, 12.5°, 16.3°, 18.6°, 25.1° and 28.3°, or (ii) 7.7°, 16.5°, 25.1° and 26.6°, or (iii) 7.9°, 16.5°, 24.4° and 27.6°, or (iv) 7.0°, 7.5°, 10.5°, 11.7°, 12.7°, 17.3°, 8.1°, 24.5°, 26.2° and 27.1°, or (v) 6.8°, 12.8°, 15.8° and 26.0° or (vi) 7.4°, 9.9°, 25.0°, 26.0°, and 28.2° of the Bragg angle ($2\theta \pm 0.2$) in the X-ray diffraction spectrum. The electrophotographic photoreceptor has a light-sensitive layer containing the photoconductive material of the crystals.

23 Claims, 12 Drawing Sheets

CRYSTALS OF HYDROXYGALLIUM PHTHALOCYANINE, METHOD OF PREPARING THE CRYSTALS, PHOTOCONDUCTIVE MATERIAL COMPRISING THE CRYSTALS, AND ELECTROPHOTOGRAPHIC PHOTORECEPTOR COMPRISING THE MATERIAL

FIELD OF THE INVENTION

The present invention relates to crystals of hydroxygallium phthalocyanine useful as a photoconductive material, a method of preparing the crystals, a photoconductive material comprising the crystals, and an electrophotographic photoreceptor comprising the photoconductive material. The photoreceptor is, in one embodiment, composed of a charge generating material and a binder resin.

BACKGROUND OF THE INVENTION

Phthalocyanine compounds are useful as materials for paint compositions, printing inks and catalysts and as electronic materials and, in particular, they have been broadly investigated as materials for electrophotographic photoreceptors, materials for optical recording and materials for photo-electric conversion in these days.

Regarding electrophotographic photoreceptors, recently, the demand for extending the light-sensitive wavelength range of organic photoconductive materials which have heretofore been proposed up to the near infrared wavelength range of semiconductor lasers (780 to 830 nm) so as to use the materials as a photoreceptor for a digital recording system such as a laser printer. From the viewpoint, squalilium compounds (as disclosed, e.g., in JP-A-49-105536 and JP-A-58-21414, triphenylamine trisazo compounds (as disclosed, e.g., in JP-A-61-151659) and phthalocyanine compounds (as disclosed, e.g., in JP-A-48-34189 and JP-A-57-148745) have been proposed as photoconductive materials for semiconductor lasers. (the term "JP-A" as used herein means an "unexamined published Japanese patent application")

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently meet the conditions.

In order to overcome various drawbacks of the known photoconductive materials, the materials have been investigated with respect to the relationship between the crystal form and the electrophotographic characteristics. In particular, many reports relating to phthalocyanine compounds have heretofore been disclosed.

In general, it is known that phthalocyanine compounds have various crystal forms, depending upon the difference in the manufacture method and treating method, and that the difference in the crystal form has a great influence on the photo-electric conversion characteristics of phthalocyanine compounds. Regarding crystal forms of phthalocyanine compounds, for example, with respect to copper phthalocyanine, various crystal forms of $\alpha$, $\pi$, $\chi$, $\rho$, $\gamma$ and $\delta$ are known in addition to a stable crystal form of $\beta$. It is also known that these crystal forms are mutually transferable to each other by mechanical strain force, sulfuric acid treatment, organic solvent treatment or heat treatment, (as described, e.g., in U.S. Pat. Nos. 2,770,029, 3,160,635, 3,708,292 and 3,357,989). JP-A-50-38543 describes the relationship between the difference of crystal forms of copper phthalocyanine and the electrophotographic characteristics of them.

Regarding the relationship between the crystal forms of hydroxygallium phthalocyanine and the electrophotographic characteristics of them, JP-A-1-221459 mentions crystals obtained by an acid-pasting method.

However, not only the above-mentioned hydroxygallium phthalocyanine crystals but also phthalocyanine compounds which have heretofore been proposed are not sufficient in point of the light sensitivity and the durability when used as a light-sensitive material.

In addition, when hydroxyallium phthalocyanine crystals are used in the form of a dispersion in a binder resin, the crystals are inferior in the dispersibility and the coatability of the dispersion. Where the crystals are used as a photoreceptor, they have problems on the light-sensitivity and the charge retentiveness. Further, they often cause drawbacks of fog or black spots in images formed. Thus, the crystals do not have sufficient characteristics.

Therefore, development of novel crystals of phthalocyanine compounds, which have improved characteristics of light sensitivity, durability, charge retentiveness, coatability and image quality with still having the intrinsic favorable characteristics of the compounds of themselves as a photoconductive material, has been desired.

The present invention has been made in view of the above-mentioned situation.

SUMMARY OF THE INVENTION

One object of the present invention is to provide novel crystals of hydroxygallium phthalocyanine.

Another object of the present invention is to provide a photoconductive material which comprises novel crystals of hydroxygallium phthalocyanine and has excellent light sensitivity and durability.

Further object of the present invention is to provide an electrophotographic photoreceptor having high sensitivity characteristics and good charge retentiveness to cause few image defects, the coatability of the photoconductive material on a support in preparing the photoreceptor being improved.

As a result of earnest investigations, the present inventors have found that novel crystals of hydroxygallium phthalocyanine having high sensitivity and durability as a photoconductive material can be obtained by applying particular treatment to hydroxygallium phthalocyanine as obtained by synthesis. The inventors further have found that an electrophotographic photoreceptor having the novel crystals and a particular binder resin in the light-sensitive layer has much improved light-sensitive characteristics and charge-retaining characteristics, that the dispersibility of the crystals in the resin as well as the coatability of the dispersion for forming the light-sensitive layer is good and that the photoreceptor causes few image defects. On the basis of the finings, they have completed the present invention.

Accordingly, the present invention provides crystals of hydroxygallium phthalocyanine having distinct diffraction peaks at the particular angles of the Bragg angle ($2\theta \pm 0.2$) in the X-ray diffraction spectrum. The particular angles are selected from the following (i) to (v): (i) 7.5°, 9.9°, 12.5°, 16.3°, 18.6°, 25.1° and 28.3°; (ii) 7.7°, 16.5°, 25.1° and 26.6°; (iii) 7.9°, 16.5°, 24.4° and 27.6°; (iv) 7.0°, 7.5°, 10.5°, 11.7°, 12.7°, 17.3°, 18.1°, 24.5°, 26.2° and 27.1°; (v) 6.8°, 12.8°, 15.8° and 26.0°; and (vi) 7.4°, 9.9°, 25.0°, 26.0° and 28.2°.

The present invention also provides a method of preparing hydroxygallium phthalocyanine crystals having distinct diffraction peaks at the particular angles (i) of the Bragg angle (2θ±0.2) in the X-ray diffraction spectrum. The method comprises treating hydroxygallium phthalocyanine with a solvent containing at least one selected from the group consisting of amides, esters and ketones.

The present invention also provides a photoconductive material for electrophotographic photoreceptor comprising at least one of the above-mentioned hydroxygallium phthalocyanine crystals having distinct diffraction peaks at the particular angles (i) to (v) of the Bragg angle (2θ±0.2) in the X-ray diffraction spectrum.

The present invention further provides an electrophotographic photoreceptor comprising an electroconductive support having thereon a light-sensitive layer containing at least one of the above-mentioned hydroxygallium phthalocyanine crystals having distinct diffraction peaks at the particular angles (i) to (v) of the Bragg angle (2θ±0.2) in the X-ray diffraction spectrum.

In a preferred embodiment the light-sensitive layer of the photoreceptor has a laminate structure comprising a charge generating layer and a charge transporting layer as laminated in this order on the support, and the charge generating layer contains the hydroxygallium phthalocyanine crystals and a binder resin comprising at least one selected from polyvinyl acetal resins, vinyl chloride-vinyl acetate copolymers, phenoxy resins and modified ether type polyester resins.

DETAILED DESCRIPTION OF THE INVENTION

Figure 1:
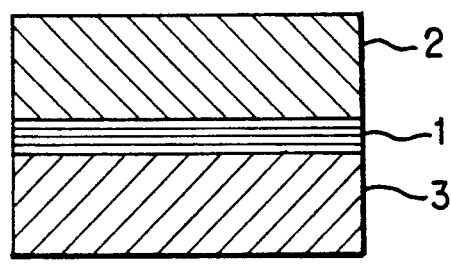
FIG. 1 is a schematic sectional view of showing an embodiment of the electrophotographic photoreceptor of the present invention.
Figure 2:
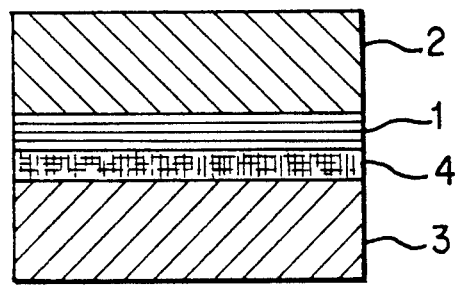
FIG. 2 is a schematic sectional view of showing another embodiment of the electrophotographic photoreceptor of the present invention.
Figure 3:
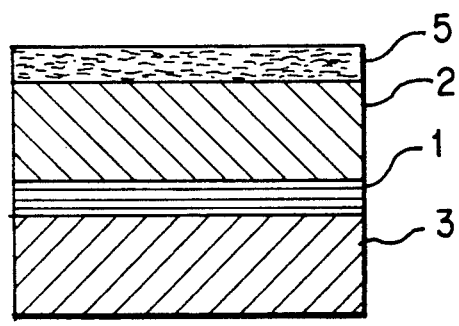
FIG. 3 is a schematic sectional view of showing still another embodiment of the electrophotographic photoreceptor of the present invention.
Figure 4:
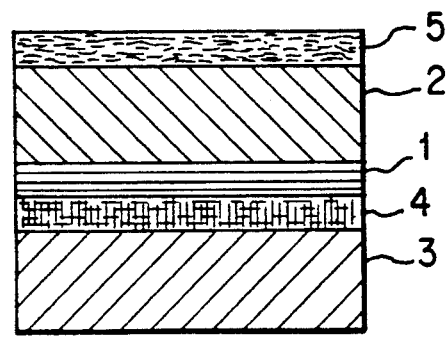
FIG. 4 is a schematic sectional view of showing still another embodiment of the electrophotographic photoreceptor of the present invention.

Hydroxygallium phthalocyanines of the present invention are represented by a general formula (I):

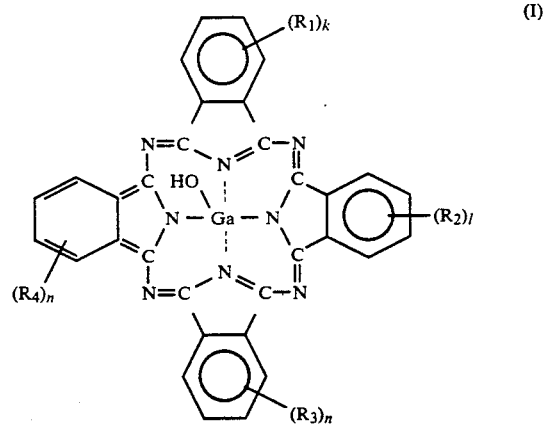

where R1, R2, R3 and R4 each represent a halogen atom or an aliphatic alkoxy group having from 1 to 5 carbon atoms; and k, l, m and n each represents an integer of from 0 to 4.

In the present invention, the X-ray diffraction pattern is the measurement results of intensities of the Bragg angle (2θ) with respect to CuK$_\alpha$ characteristic X-ray (wavelength: 1.541 Å). The measurement conditions are as follows:

Apparatus: X-ray diffractometer (RAD-RC produced by Rigaku K. K.)
Target: Cu (1.54050 Å)
Voltage: 40.0 KV
Start angle: 5.00 deg Stop angle: 40.00 deg
Step angle: 0.020 deg Hydroxygallium phthalocyanine crystals of the present invention are novel and are useful as a photoconductive materials, and they can be produced in the manner mentioned below for example.

Chlorogallium phthalocyanine produced by known methods is subjected to hydrolysis in an acid or alkaline solution or to acid-pasting so as to produce a hydroxygallium phthalocyanine. Alternatively, hydroxygallium phthalocyanine can be obtained in such a manner that a solution obtained by dissolving chloroindium phthalocyanine in conc. sulfuric acid is poured into water, and the resulting mixture is neutralized with ammonia to obtain hydroxyindium phthalocyanine (as disclosed in *Bull. Soc. Chim. France*, 1962, pp. 23-26 (1962)). The resulting hydroxygallium phthalocyanine crystals are directly treated with a solvent, or they are amorphatized by acid-pasting or mechanically milled in a ball mill, mortar, sand mill, kneader or attritor, and then treated with a solvent, to obtain the intended hydroxygallium phthalocyanine crystals of the present invention. If desired, a grinding aid such as sodium chloride or Glauber's salt may be used during grinding. The proportion of the grinding aid to the hydroxygallium phthalocyanine crystals to be ground is generally from 0.5/1 to 20/1, and preferably from 1/1 to 10/1. By using the grinding aid, the starting crystals can be transferred into crystals with a uniform crystal form extremely efficiently.

Crystal forms of hydroxygallium phthalocyanine crystals of the present invention vary depending on the kind of the above-mentioned treating conditions. Examples of the solvents used in the above solvent treatment include the following compounds:

(i) Examples of the solvents used for preparing hydroxygallium phthalocyanine crystals having distinct diffraction peaks at 7.5°, 9.9°, 12.5°, 16.3°, 18.6°, 25.1° and 28.3° of the Bragg angle ($2\theta \pm 0.2$) in the X-ray diffraction spectrum pattern include amides (e.g., N,N-dimethylformamide, N,N-dimethylacetamide, N-methylpyrrolidone), esters (e.g., ethyl acetate, n-butyl acetate, iso-amyl acetate), and ketones (e.g., acetone, methyl ethyl ketone, methyl iso-butyl ketone).

(ii) Examples of the solvents used for preparing hydroxygallium phthalocyanine crystals having distinct diffraction peaks at 7.7°, 16.5°, 25.1° and 26.6° of the Bragg angle ($2\theta \pm 0.2$) in the X-ray diffraction spectrum pattern include alcohols (e.g., methanol, ethanol), and aromatic compounds (e.g., toluene, chlorobenzene).

(iii) Examples of the solvents used for preparing hydroxygallium phthalocyanine crystals having distinct diffraction peaks at 7.9°, 16.5°, 24.4° and 27.6° of the Bragg angle ($2\theta \pm 0.2$) in the X-ray diffraction spectrum pattern include organic amines (e.g., pyridine, piperidine), and sulfoxides (e.g., dimethylsulfoxide).

(iv) Examples of the solvents used for preparing hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle ($2\theta \pm 0.2$) in the X-ray diffraction spectrum pattern include aromatic alcohols (e.g., benzyl alcohol).

(v) Examples of the solvents used for preparing hydroxygallium phthalocyanine crystals having distinct diffraction peaks at 6.8°, 12.8°, 15.8° and 26.0° of the Bragg angle ($2\theta \pm 0.2$) in the X-ray diffraction spectrum pattern include polyhydric alcohols (e.g., ethylene glycol, glycerin, polyethylene glycol).

(vi) Examples of the solvents used for preparing hydroxygallium phthalocyanine crystals having distinct diffraction peaks at 7.4°, 9.9°, 25.0°, 26.0°, and 28.2° of the Bragg angle ($2\theta \pm 0.2$) in the X-ray diffraction spectrum pattern include amides (e.g., N,N-dimethylformamide, N,N-dimethylacetamide, N-methylpyrrolidone), esters (e.g., ethyl acetate, n-butyl acetate, iso-amyl acetate), and ketones (e.g., acetone, methyl ethyl ketone, methyl iso-butyl ketone).

The solvent to be used in preparing the above-mentioned hydroxygallium phthalocyanine crystals may be in the form of a mixed solvent comprising two or more different solvents or an aqueous mixed solvent comprising one or more different solvents and water.

In accordance with the present invention, a hydroxygallium phthalocyanine is brought into contact with the prescribed solvent to prepare the above-mentioned hydroxygallium phthalocyanine crystals having distinct diffraction peaks at the particular Bragg angles in an X-ray diffraction spectrum pattern. Such solvent treatment includes, for example, not only ordinary recrystallization treatment, but also treatment of a hydroxygallium phthalocyanine, which has been treated with an ordinary organic solvent for a purification during or after synthesis thereof, by washing or wet-grinding with the prescribed solvent. Specifically, in order to prepare hydroxygallium phthalocyanine crystals having the determined crystal form, hydroxygallium phthalocyanine is subjected to solvent treatment by at least one of these treating methods. If any other organic solvents than those defined in the above-mentioned (i) to (vi) are used for washing or wet-grinding treatment of hydroxygallium phthalocyanine, crystal transfer into the desired hydroxygallium phthalocyanine crystals each with the determined crystal form of anyone of (i) to (vi) may sometimes be impossible.

Regarding the solvent treatment conditions, the amount of the solvent used is generally from 1 to 200 parts, and preferably from 10 to 100 parts, per one part of hydroxygallium phthalocyanine to be treated therewith; and the treating temperature is generally from 0° to 150° C., and preferably from room temperature to 100° C. The solvent treatment may be effected in an appropriate vessels under static condition or with stirring. Wet grinding in a ball mill, a mortar, a sand mill, a kneader or an attritor may be effected with the determined solvent. In grinding, inorganic compounds such as sodium chloride or Glauber's salt as well as grinding media such as glass beads, steel beads or alumina beads can be used.

By the above-mentioned solvent treatment, the crystals of hydroxygallium phthalocyanine of the present invention advantageously having better crystallinity and having a more uniform grain size distribution can be obtained.

The present invention also provides an electrophotographic photoreceptor, which has the above-mentioned hydroxygallium phthalocyanine crystals to be obtained by the above-mentioned solvent treatment, as the photoconductive material in the light-sensitive layer.

In the photographic photoreceptor of the present invention, the light-sensitive layer may be a single layer or may have a laminated structure composed of a charge generating layer and a charge transporting layer each having a different function. In the latter case, the charge generating layer is composed of the above-mentioned hydroxygallium phthalocyanine crystals and a binder resin.

FIG. 1 to FIG. 4 are schematic sectional views showing embodiments of the electrophotographic photoreceptor of the present invention. In the embodiment shown in FIG. 1, a light-sensitive layer composed of charge generating layer 1 and charge transporting layer 2 as laminated thereover, is coated over electroconductive support 3. In the embodiment shown in FIG. 2, subbing layer 4 is provided between charge generating layer 1 and electroconductive support 3. In the embodiment shown in FIG. 3, protective layer 5 is coated over the light-sensitive layer. In the embodiment shown in FIG. 4, the photoreceptor has both subbing layer 4 and protective layer 5.

These layers 1 to 5 will be explained in detail hereunder, along with a light-sensitive layer with a single layer constitution.

Charge generating layer 1 of the electrophotographic photoreceptor of the present invention can be formed by preparing a coating composition of a dispersion of the above-mentioned hydroxygallium phthalocyanine crystals dispersed in a solution of a binder resin dissolved in an organic solvent, followed by coating the composition onto electroconductive support 3.

The binder resin used in charge generating layer 1 may be selected from various resins of a broad range. Examples thereof include insulating resins, such as polyvinyl acetal resins (e.g., polyvinyl butyral resins, polyvinyl formal resins, and partially acetallized polyvinyl butyral resins in which a part of the butyral moiety has been modified with formal or acetacetal), polyarylate resins (e.g., polycondensate of bisphenol A and phthalic acid), polycarbonate resins, polyester resins, modified ether type polyester resins, phenoxy resins, polyvinyl chloride resins, polyvinylidene chloride resins, polyvinyl acetate resins, polystyrene resins, acrylic resins, methacrylic resins, polyacrylamide resins, polyamide resins, polyvinyl pyrimidine resins, cellulosic resins, polyurethane resins, epoxy resins, silicone resins, polyvinyl alcohol resins, polyvinyl pyrrolidone resins, casein, vinyl chloride-vinyl acetate type copolymers (e.g., vinyl chloride-vinyl acetate copolymer, hydroxyl-modified vinyl chloride-vinyl acetate copolymer, carboxy-modified vinyl chloride-vinyl acetate copolymer, vinyl chloride-vinyl acetate-maleic anhydride copolymer), styrene-butadiene copolymers, vinylidene chloride-acrylonitrile copolymers, styrene-alkyd resins, silicone-alkyd resins, and phenol-formaldehyde resins. In addition, organic photoconductive polymers such as poly-N-vinyl carbazole, polyvinyl anthracene and polyvinyl pyrene can also be used. However, these insulating resins and organic photoconductive polymers are not limitative. These binder resins can be used singly or in combination of two or more of them.

As the solvent of dissolving the binder resin, preferred is an organic solvent which does not dissolve subbing layer 4. Specific examples of the organic solvents include alcohols such as methanol, ethanol, n-propanol, i-propanol, n-butanol and benzyl alcohol; ketones such as acetone, methyl ethyl ketone and cyclohexanone; amides such as dimethylformamide and dimethylacetamide; sulfoxides such as dimethylsulfoxide; cyclic or linear ethers such as tetrahydrofuran, dioxane, diethyl ether, methyl cellosolve and ethyl cellosolve; ester such as methyl acetate, ethyl acetate and n-butyl acetate; halogenated aliphatic hydrocarbons such as methylene chloride, chloroform, carbon tetrachloride, dichloroethylene and trichloroethylene; mineral oils such as ligroin; aromatic hydrocarbons such as benzene, toluene and xylene; and halogenated aromatic hydrocarbons such as chlorobenzene and dichlorobenzene. These can be used singly or in combination of two or more of them.

The proportion of the above-mentioned hydroxygallium phthalocyanine crystals to the binder resin generally falls within the range of from 40/1 to 1/20, and preferably from 10/1 to 1/10, by weight. If the proportion of the hydroxygallium phthalocyanine crystals is too high, the stability of the coating composition tends to lower. If it is too low, the sensitivity of the photoreceptor tends to lower. Therefore, the proportion generally falls within the above range.

For dispersing the hydroxygallium phthalocyanine crystals, any ordinary methods, such as ball mill dispersion method, attritor dispersion method or sand mill dispersion method, can be employed. The crystals are preferred to be dispersed finely to have a grain size of 0.5 μm or less, more preferably 0.3 μm or less, and particularly preferably 0.15 μm or less. In dispersing the crystals, such a condition is needed that the crystal form of the hydroxygallium phthalocyanine crystals to be dispersed does not change. In this connection, the present inventors confirmed that the crystal forms of the hydroxygallium phthalocyanine crystals of the present invention do not change after dispersion by employing any of the above-mentioned dispersion methods.

For coating the coating composition, any conventional method may be employed, such as dip coating method, spray coating method, spinner coating method, bead coating method, wire bar coating method, blade coating method, roller coating method, air knife coating method or curtain coating method. Drying of the coated composition may be effected preferably by drying to touch at room temperature followed by drying with heat under static condition or with blowing at a temperature of from 30° to 200° C. for a period of from 5 minutes to 2 hours. The thickness of charge generating layer 1 is generally from 0.05 to 5 μm, and preferably from 0.2 to 2.0 μm.

In charge generating layer 1, the hydroxygallium phthalocyanine crystals of the present invention having distinct diffraction peaks at 7.5°, 9.9°, 12.5°, 16.3°, 18.6°, 25.1° and 28.3° of the Bragg angle (2θ±0.2°) in the X-ray diffraction spectrum pattern are preferably selected from the viewpoints of the light-sensitivity and durability. Of the above-mentioned binder resins, at least one selected from polyvinyl acetal resins, vinyl chloride-vinyl acetate copolymers, phenoxy resins and modified ether type polyester resins are preferred from the viewpoints of the dispersibility of hydroxygallium phthalocyanine crystals therein, the coatability of the resulting dispersion as a coating composition and the sensitivity characteristics, charge retentiveness and image characteristics of the photoreceptor formed with the coating composition. The combination of hydroxygallium phthalocyanine crystals of the present invention having distinct diffraction peaks at 7.5°, 9.9°, 12.5°, 16.3°, 18.6°, 25.1° and 28.3° of the Bragg angle (2θ±0.2°) in the X-ray diffraction spectrum pattern and these binder resins are favorable since the photographic characteristics of the electrophotographic photoreceptor to be manufactured are especially excellent.

Charge transporting layer 2 of the electrophotographic photoreceptor of the present invention may be formed by incorporating a charge transporting material into a binder.

As the charge transporting material, any known charge transporting materials can be used, for example, oxadiazole derivatives such as 2,5-bis-(p-diethylaminophenyl)-1,3,4-oxadiazole; pyrazoline derivatives such as 1,3,5-triphenylpyrazoline and 1-[pyridyl-(2)]-3-(p-diethylaminostyryl)-5-(p-diethylaminophenyl)pyrazoline; aromatic tertiary monoamino compounds such as triphenylamine and dibenzylaniline; aromatic tertiary diamino compounds such as N,N'-diphenyl-N,N'-bis(m-tolyl)benzidine; 1,2,4-triazine derivatives such as 3-(p-diethylaminophenyl)-5,6-di-(p-methoxyphenyl)-1,2,4-triazine; hydrazone derivatives such as 4-diethylaminobenzaldehyde-2,2-diphenylhydrazone; quinazoline derivatives such as 2-phenyl-4-styrylquinazoline; benzofuran derivatives such as 6-hydroxy-2,3-di-(p-methoxyphenyl)benzofuran; α-stilbene derivatives such as p-(2,2-diphenylvinyl)-N,N-diphenylaniline; triphenylmethane derivatives; enamine derivatives as described in *Journal of Imaging Science*, vol. 29, p. 7-10 (1985); carbazole, N-ethylcarbazole, poly-N-vinyl carbazole, halogenated poly-N-vinyl carbazoles, polyglycidyl carbazole, poly-γ-carbazole ethyl glutamate and their derivatives; polycyclic aromatic compounds such as anthracene, pyrene and phenanthrene; nitrogen-containing heterocyclic compounds such as indole and imidazole; and polyvinyl anthracene, poly-9-vinylphenyl anthracene, polyvinyl pyrene, polyvinyl acridine, polyvinyl acenaphthene, pyrene-formaldehyde resins, and ethylcarbazole-formaldehyde resins. However, these are not limitative. These charge transporting materials can be used either singly or in combination of two or more of them. Where a photoconductive polymer is used as the charge transporting material, it may form a layer by itself.

As the binder resin of forming charge transporting layer 2, those mentioned above for charge generating layer 1 can be used, for example, polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenolformaldehyde resins, styrene-alkyd resins, and poly-N-vinylcarbazole resins.

Charge transporting layer 2 can be formed by preparing a coating composition from the above-mentioned charge transporting material and the binder resin and an organic solvent such as those mentioned above for charge generating layer 1, followed by coating the resulting coating composition onto charge generating layer 1 by the same means as the above-mentioned coating means. The proportion of the charge transporting material to the binder resin is preferably from 10/1 to 1/5 by weight. The thickness of charge transporting layer 2 is generally approximately from 5 to 50 μm, and preferably from 10 to 30 μm.

Where the light-sensitive layer of the photoreceptor of the present invention has a single layer constitution, the light-sensitive layer is a photoconductive layer comprising the above-mentioned hydroxygallium phthalocyanine crystals as dispersed in a charge transporting material and a binder resin. As the charge transporting material and binder resin, those to be used in preparing a laminate-structure light-sensitive layer can be used. The single-layer photoconductive layer may be formed in the same manner as mentioned above. Use of hydroxygallium phthalocyanine crystals having distinct diffraction peaks at 7.5°, 9.9°, 12.5°, 16.3°, 18.6°, 25.1° and 28.3° of the Bragg angle (2θ±0.2°) in the X-ray diffraction spectrum pattern and at least one binder resin selected from polyvinyl acetal resins, vinyl chloride-vinyl acetate copolymers phenoxy resins and modified ether type polyester resins is the most preferred because of the same reasons as mentioned above.

Where the light-sensitive layer is has a single layer constitution, the proportion of the charge transporting material to the binder resin is preferably be approximately from 1/20 to 5/1 by weight; and the proportion of the hydroxygallium phthalocyanine crystals to the charge transporting material is preferably approximately from 1/10 to 10/1 by weight.

As the electroconductive support 3, any conventional materials for preparing electrophotographic photoreceptors can be employed.

Specific examples thereof include metals such as aluminium, nickel, chromium and stainless steel; plastic films as coated with aluminium, titanium, nickel, chromium, stainless steel, gold, vanadium, tin oxide, indium oxide or ITO; as well as plastic films or paper coated with or dipped in an electroconductivity imparting agent. Electroconductive support 3 can be used in any shape such as a drum, sheet or plate support, which, however, is not limitative. If desired, the surface of electroconductive support 3 may be subjected to various treatment as long as the treatment would not have any adverse influence on the resulting image quality. For instance, the surface may be oxidized, treated with chemicals, colored or matted for making the surface diffusively reflectable.

In the present invention, subbing layer 4 may be provided between electroconductive support 3 and the light-sensitive layer. Subbing layer 4 is effective for inhibiting injection of any unnecessary charges from electroconductive support 3 to the light-sensitive layer while the layer is charged, and it has a function of improving the charging property of the light-sensitive layer. In addition, it also has another function of elevating the adhesiveness between the light-sensitive layer and electroconductive support 3. Furthermore, it may also have a function of preventing light reflected from electroconductive support 3.

Examples of materials of forming subbing layer 4 include polyethylene resins, polypropylene resins, acrylic resins, methacrylic resins, vinyl chloride resins, vinylidene chloride resins, vinyl acetate resins, phenolic resins, polycarbonate resins, polyurethane resins, polyamide resins, polyimide resins, polyvinyl acetal resins, vinyl chloride-vinyl acetate copolymers, polyvinyl alcohol resins, polyacrylic acid resins, polyacrylamide resins, polyvinyl pyrrolidone resins, polyvinyl pyridine resins, water-soluble polyester resins, cellulose ester resins such as nitrocellulose, cellulose ether resins, caseins, gelatins, polyglutamic acids, starches, starch acetates, amino starches, organic zirconium compounds such as zirconium chelate compounds and zirconium alkoxide compounds, organic titanyl compounds such as titanyl chelate compounds and titanyl alkoxide compounds, and silane coupling agents.

As the coating method for forming subbing layer 4, any conventional method can be used. Examples thereof include blade coating method, wire bar coating method, spray coating method, dip coating method, bead coating method, air knife coating method, and curtain coating method. The thickness of the subbing layer 4 is generally from 0.01 to 10 μm, and preferably from 0.05 to 2 μm.

In the present invention, the surface of the light-sensitive layer may be coated with protective layer 5 if desired. Protective layer 5 is formed for the purpose of preventing chemical deterioration of charge transporting layer 2 during charging of the laminate-structure light-sensitive layer and of improving the mechanical strength of the light-sensitive layer.

Protective layer 5 can be formed by incorporating an electroconductive material in a binder resin. Examples of the electroconductive material include metallocene compounds such as dimethylferrocene; aromatic amino compounds such as N,N'-diphenyl-N,N'-bis-(m-tolyl)-benzidine; and metal oxides such as antimony oxide, tin oxide, titanium oxide, indium oxide, and tin oxide-antimony oxide. However, these are not limitative. As the binder resin, any conventional binder resin can be used. Examples thereof include polyamide resins, polyurethane resins, polyester resins, epoxy resins, polyketone resins, polycarbonate resins, polyvinyl ketone resins, polystyrene resins, and polyacrylamide resins.

Protective layer 5 is preferably to have an electric resistance of from $10^9$ to $10^{14}$ Ω·cm. If the electric resistance of the layer is more than $10^{14}$ Ω·cm, the residual potential tends to rise to give images with much fog. If it is less than $10^9$ Ω·cm, the images to be formed tends to be blurred and the resolving power would lower. The protective layer must be formed in such a way that it does not substantially interfere with penetration of the light therethrough as irradiated thereto for imagewise exposure.

For forming protective layer 5, any conventional coating methods may be employed. Examples thereof include blade coating method, wire bar coating method, spray coating method, dip coating method, bead coating method, air knife coating method, and curtain coating method. The thickness of protective layer 5 is generally from 0.5 to 20 μm, and preferably from 1 to 10 μm.

The present invention will be explained in more detail by way of the following examples, which, however, are not intended to restrict the scope of the present invention. Unless otherwise specifically defined, all "parts" therein are by weight.

SYNTHESIS EXAMPLE 1

Synthesis of Chlorogallium Phthalocyanine 30 parts of 1,3-diiminoisoindoline and 9.1 parts of gallium trichloride were put in 230 parts of quinoline and reacted for 3 hours at 200° C. The product formed was taken out by filtration and then washed with acetone and methanol. The wet cake formed was dried to obtain 28 parts of chlorogallium phthalocyanine crystals.

Figure 5:
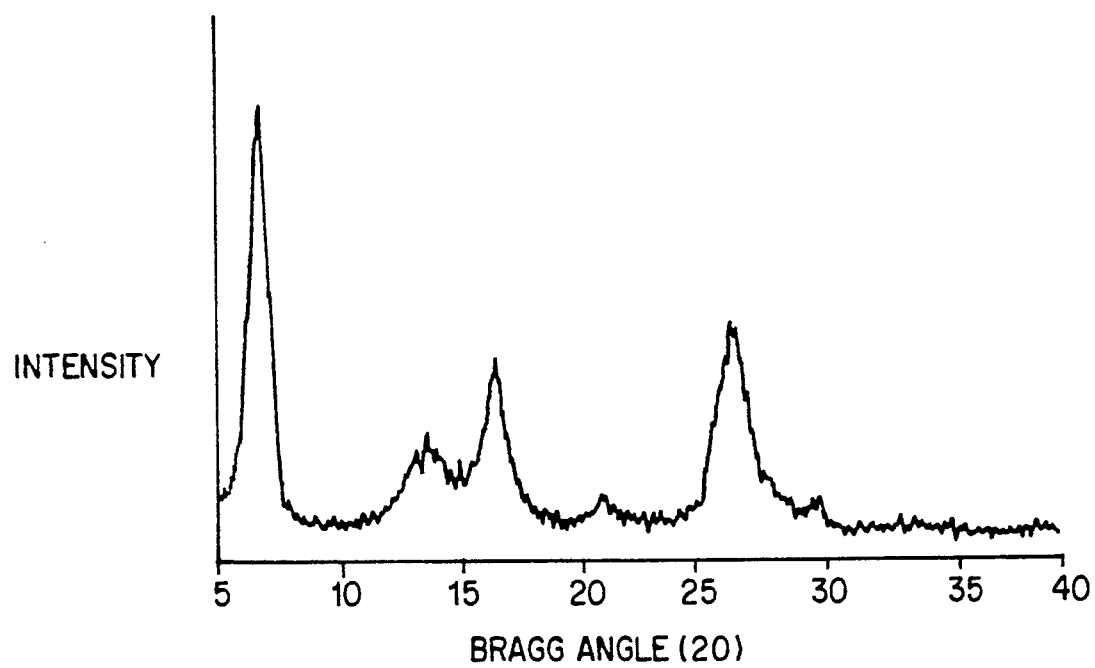
FIG. 5 is a powder X-ray diffraction pattern of hydroxygallium phthalocyanine crystals obtained in Synthesis Example 1.

Synthesis of Hydroxygallium phthalocyanine 3 parts of the chlorogallium phthalocyanine crystals obtained above were dissolved in 60 parts of concentrated sulfuric acid at 0° C., and the resulting solution was dropped into 450 parts of distilled water at 5° C. whereupon crystals precipitated out. After washed with distilled water and dilute aqueous ammonia and dried, 2.5 parts of hydroxygallium phthalocyanine crystals were obtained. FIG. 5 shows the powder X-ray diffraction pattern of the resulting crystals.

Figure 6:
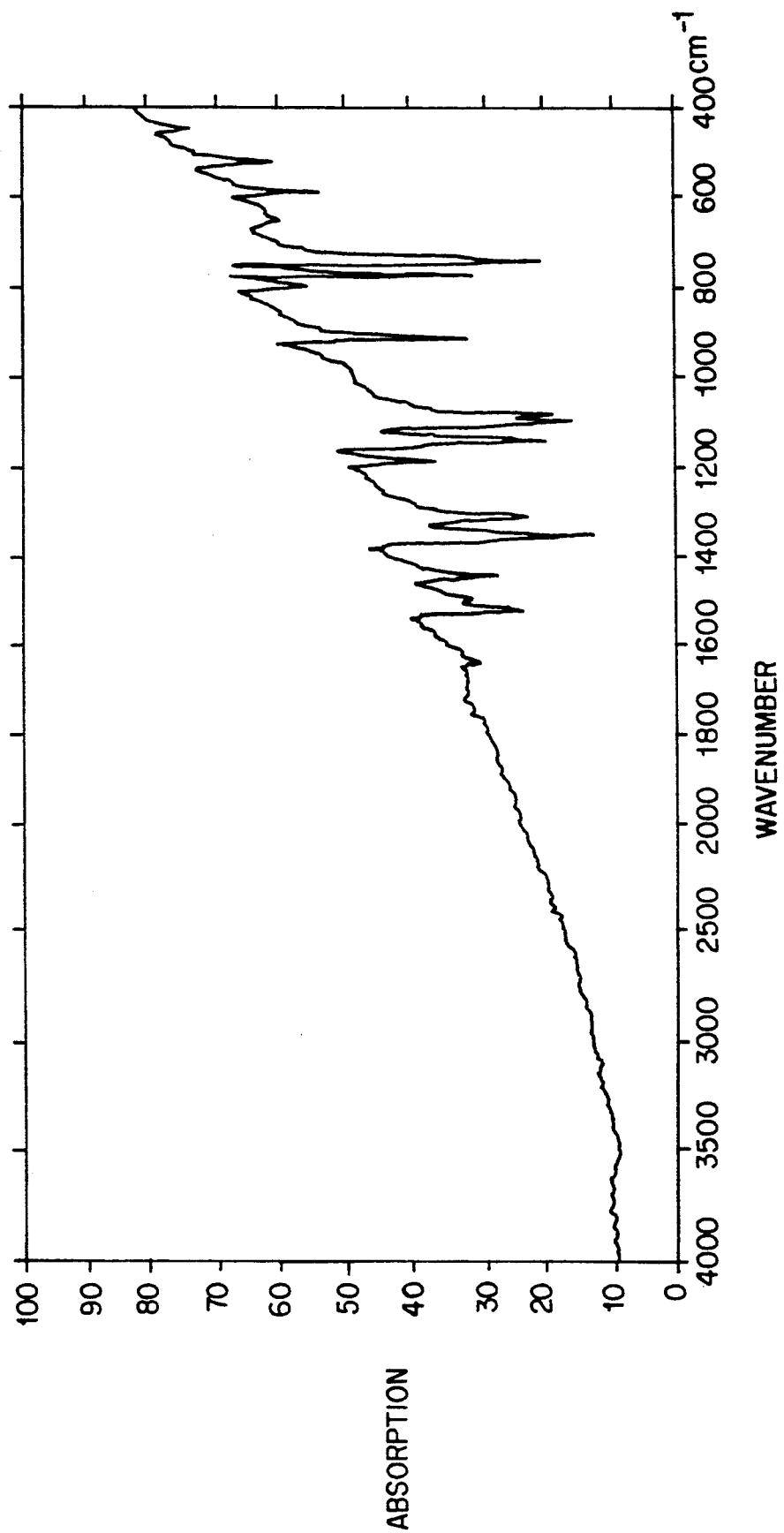
FIG. 6 is an infrared spectrum pattern of hydroxygallium phthalocyanine crystals obtained in Synthesis Example 1.

The IR spectrum of the thus obtained hydroxygallium phthalocyanine crystals is shown in FIG. 6, and the data (%) of elementary analysis of them are shown in Table 1 below.

TABLE 1

| Elementary Analysis of Hydroxygallium Phthalocyanine ($C_{32}H_{17}N_8OGa$) | | | | |
|---|---|---|---|---|
| Elementary Analysis | C | H | N | Cl |
| Calculated | 64.14 | 2.86 | 18.70 | — |
| Measured | 62.06 | 2.67 | 17.62 | 0.46 |

SYNTHESIS EXAMPLE 2

Figure 7:
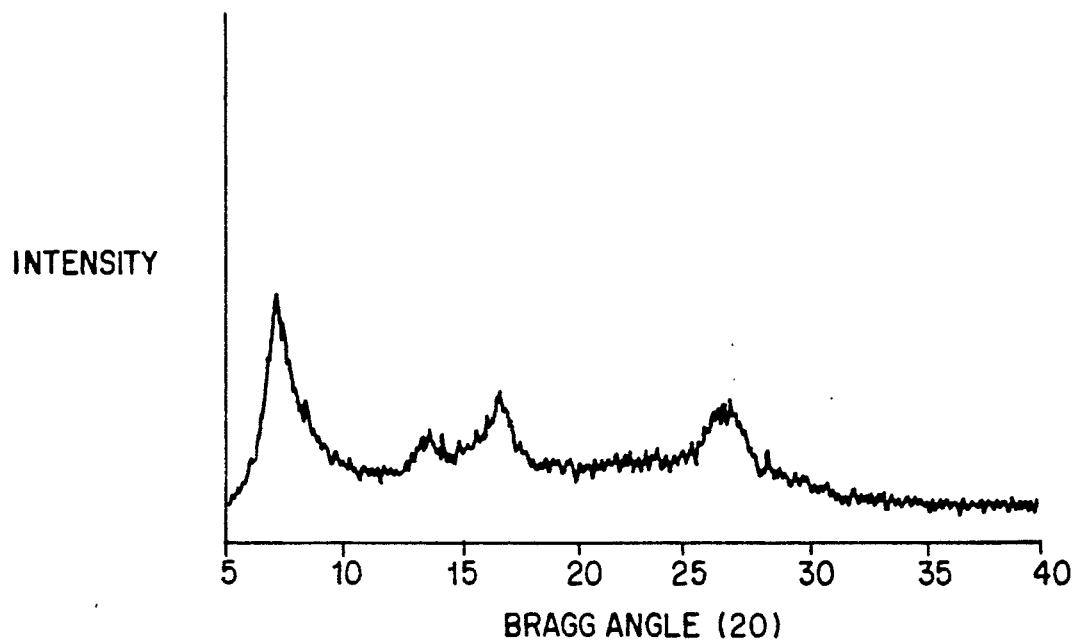
FIG. 7 is a powder X-ray diffraction pattern of hydroxygallium phthalocyanine crystals obtained in Synthesis Example 2.

The hydroxygallium phthalocyanine crystals as obtained in Synthesis Example 1 were ground in an automatic mortar grinder for 55 hours to obtain an amorphous hydroxygallium phthalocyanine. FIG. 7 shows the powder X-ray diffraction pattern of the product.

EXAMPLE 1

Figure 8:
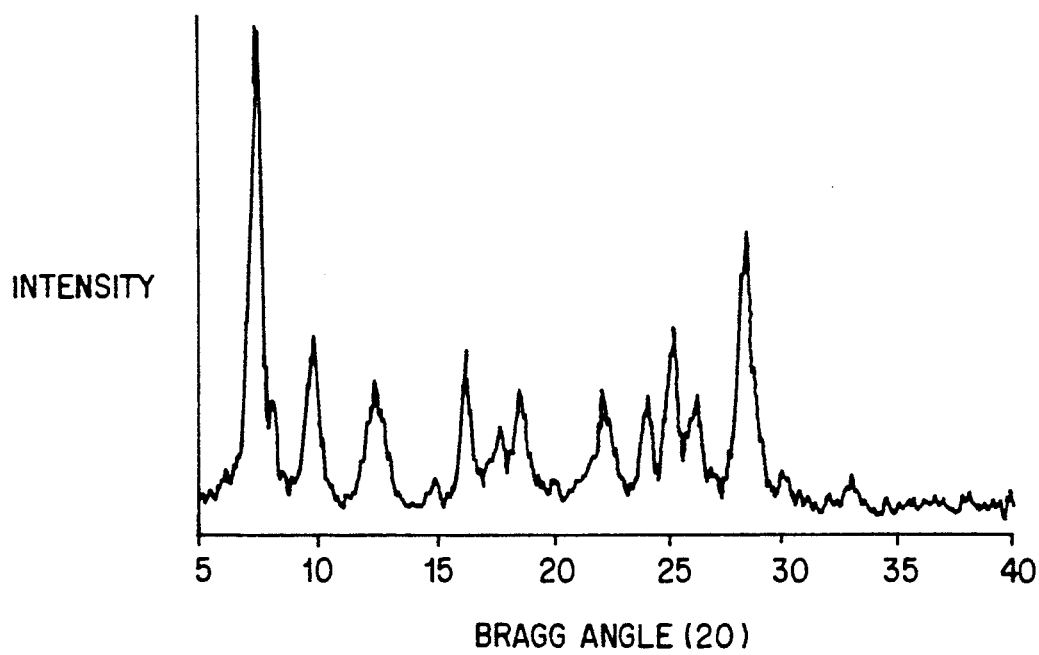
FIG. 8 is a powder X-ray diffraction pattern of hydroxygallium phthalocyanine crystals obtained in Example 1.

0.5 part of the hydroxygallium phthalocyanine crystals as obtained in Synthesis Example 1 were milled along with 15 parts of dimethylformamide and 30 parts of 1 mm-diameter glass beads for 24 hours, and the milled crystals were separated. Next, these were washed with methanol and dried to obtain 0.4 part of hydroxygallium phthalocyanine crystals. FIG. 8 shows the powder X-ray diffraction pattern of the crystals.

Figure 9:
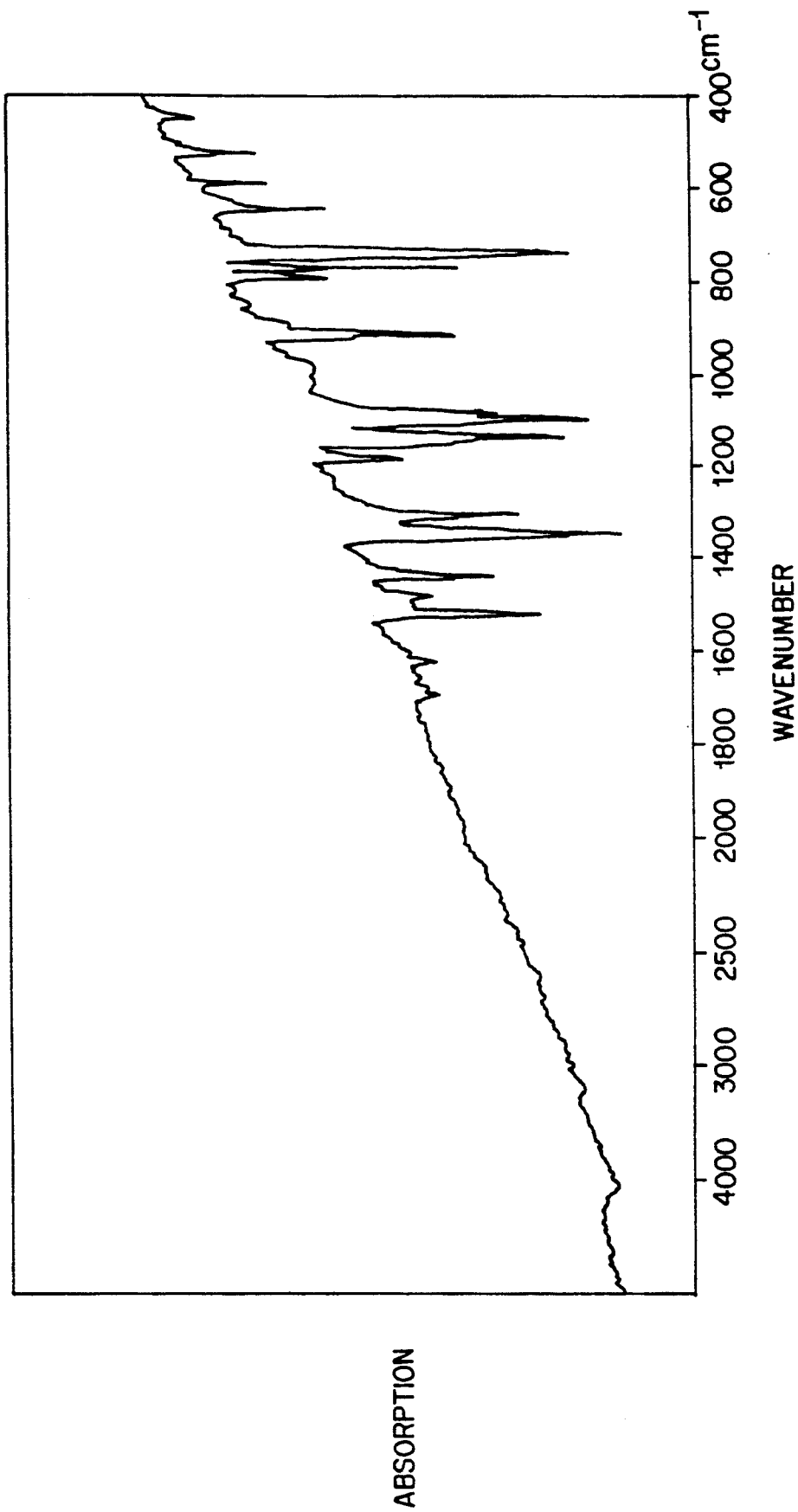
FIG. 9 is an infrared spectrum pattern of hydroxygallium phthalocyanine crystals obtained in Example 1.
Figure 20:
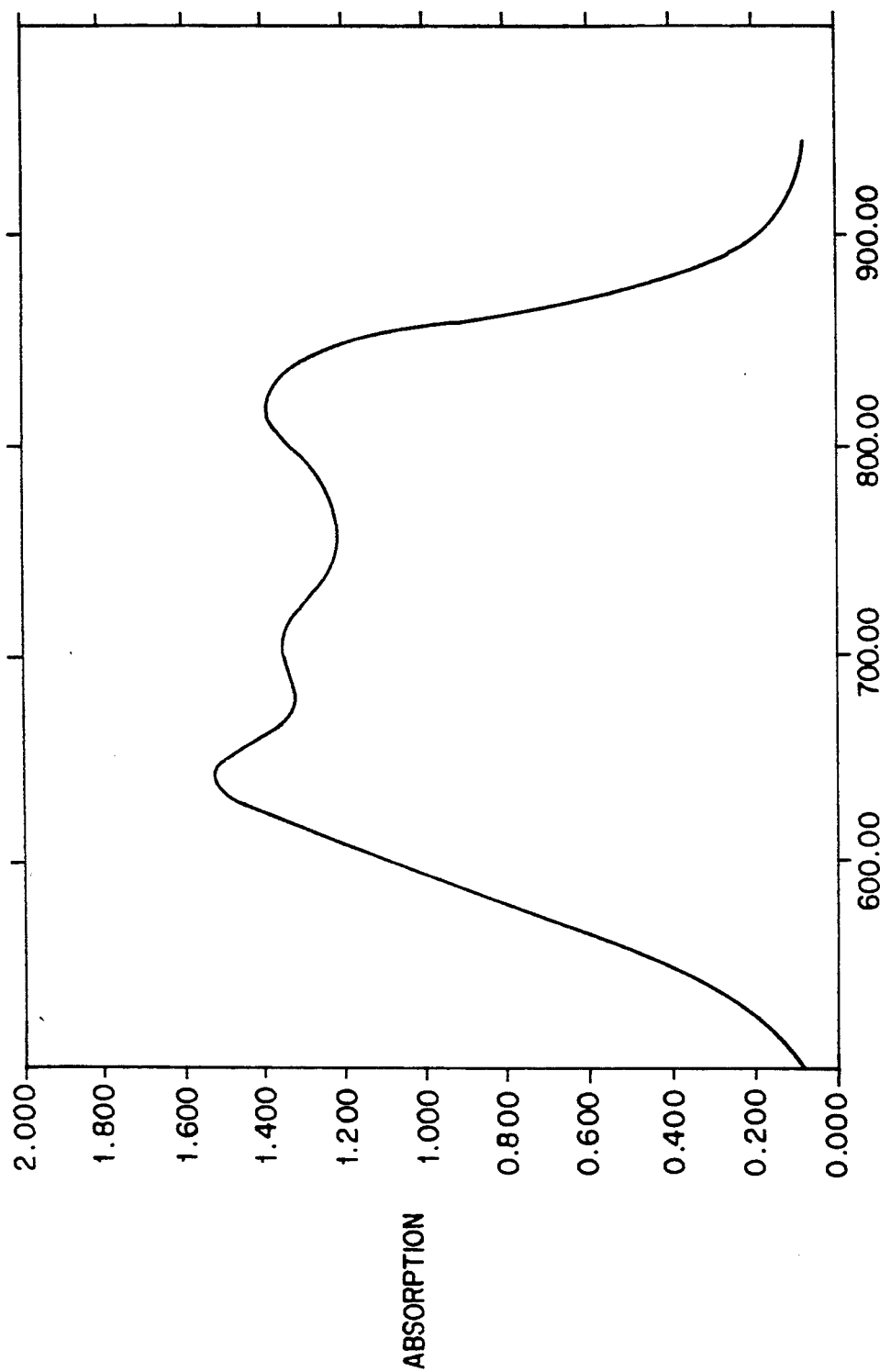
FIG. 20 is a visible-infrared spectrum pattern of hydroxygallium phthalocyanine crystal obtained in Example 1.

The IR spectrum of the thus obtained hydroxygallium phthalocyanine crystals is shown in FIG. 9, the data (%) of elementary analysis of them are shown in Table 2 below, and the visible-infrared absorption spectrum of them is shown in FIG. 20.

TABLE 2

| Elementary Analysis of Hydroxygallium Phthalocyanine ($C_{32}H_{17}N_8OGa$) | | | | |
|---|---|---|---|---|
| Elementary Analysis | C | H | N | Cl |
| Calculated | 64.14 | 2.86 | 18.70 | — |
| Measured | 63.26 | 2.77 | 18.44 | 0.33 |

EXAMPLE 2

Figure 10:
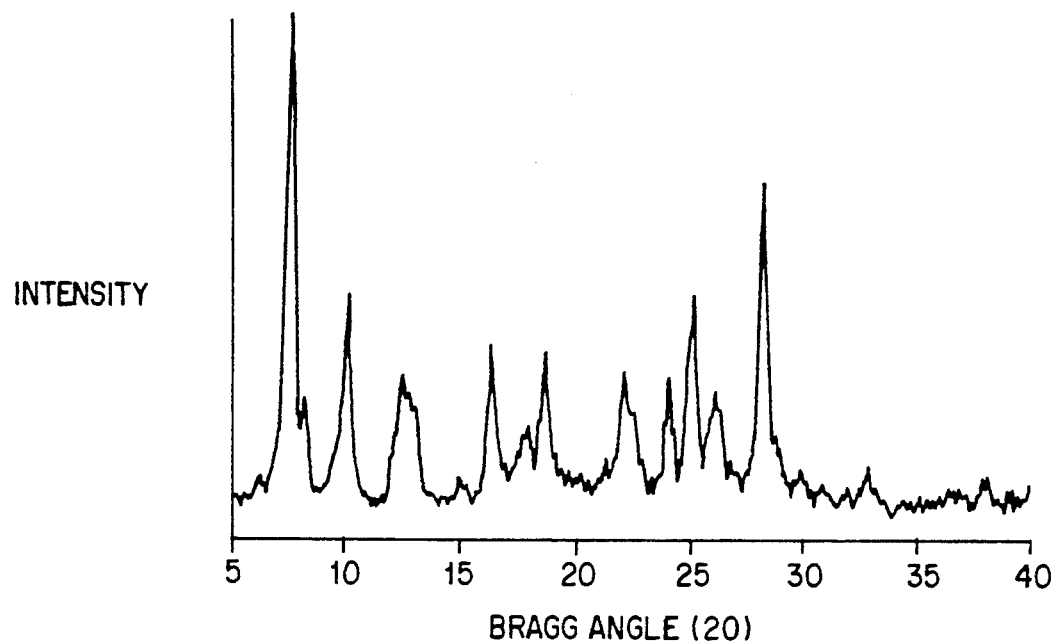
FIG. 10 is a powder X-ray diffraction pattern of hydroxygallium phthalocyanine crystals obtained in Example 2.

The same process as that in Example 1 was repeated, except that the washing solvent was replaced by n-butyl acetate, to obtain 0.4 part of hydroxygallium phthalocyanine crystals. FIG. 10 shows the powder X-ray diffraction pattern of the crystals. The IR spectrum of the crystals was same as that of FIG. 9.

EXAMPLE 3

Figure 11:
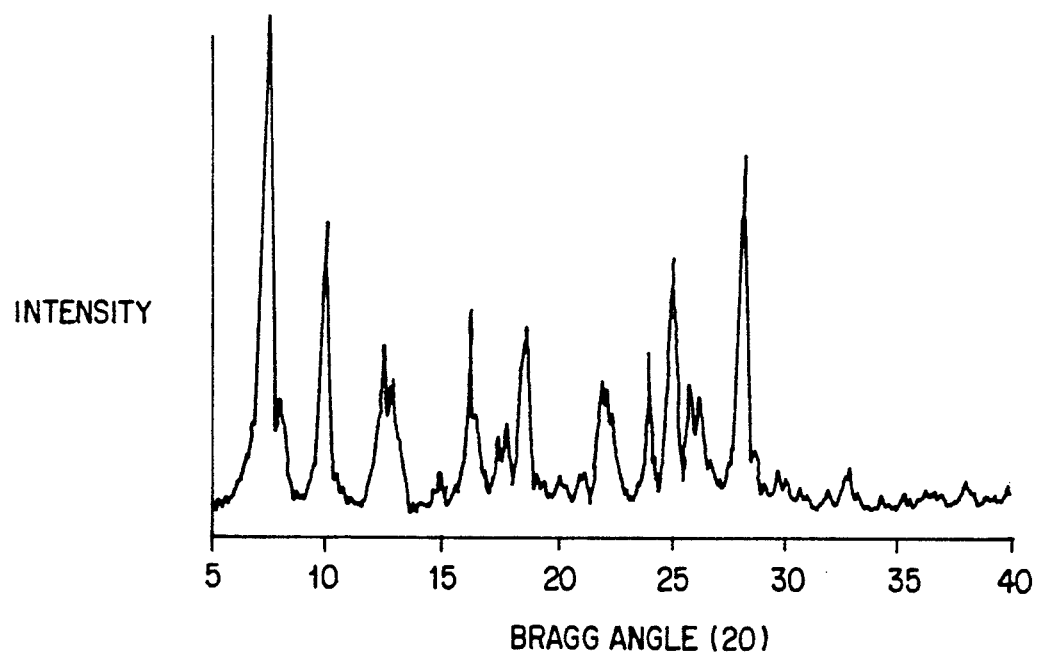
FIG. 11 is a powder X-ray diffraction pattern of hydroxygallium phthalocyanine crystals obtained in Example 3.

1.2 parts of the hydroxygallium phthalocyanine crystals as obtained in Synthesis Example 2 were stirred along with 15 parts of n-butyl acetate at 100° C. for 7 hours, and the crystals were then separated. These were washed with n-butyl acetate and dried to obtain 1.0 part of hydroxygallium phthalocyanine crystals. FIG. 11 shows the powder X-ray diffraction pattern of the crystals.

EXAMPLE 4

Figure 12:
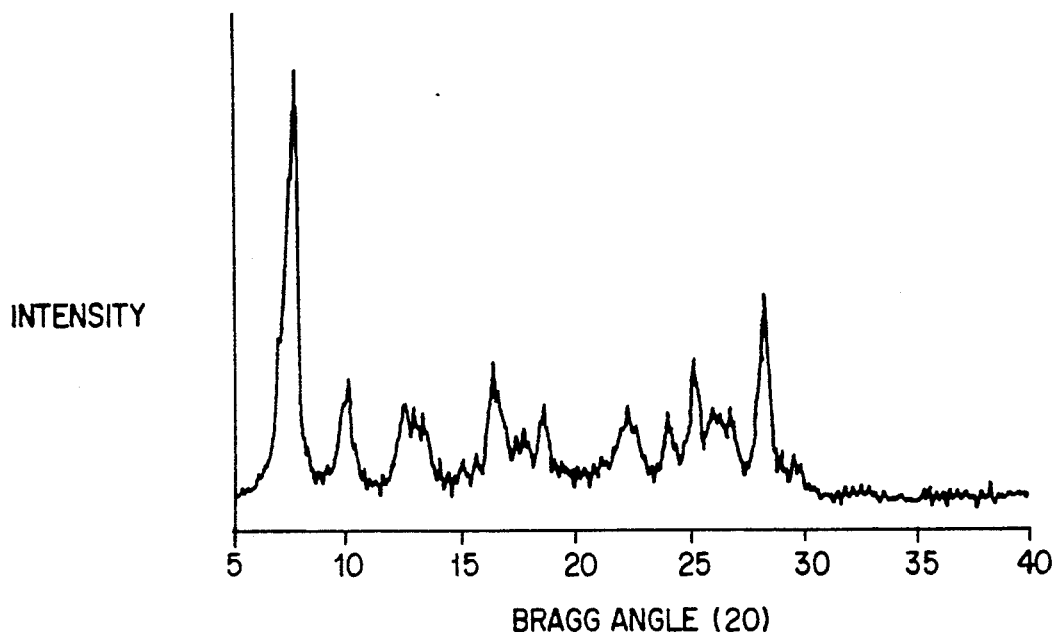
FIG. 12 is a powder X-ray diffraction pattern of hydroxygallium phthalocyanine crystals obtained in Example 4.

1.2 parts of the hydroxygallium phthalocyanine crystals as obtained in Synthesis Example 2 were stirred along with 15 parts of methyl ethyl ketone at 60° C. for 7 hours, and the crystals were then separated. These were washed with methyl ethyl ketone and dried to obtain 1.0 part of hydroxygallium phthalocyanine crystals. FIG. 12 shows the powder X-ray diffraction pattern of the crystals.

EXAMPLE 5

Figure 13:
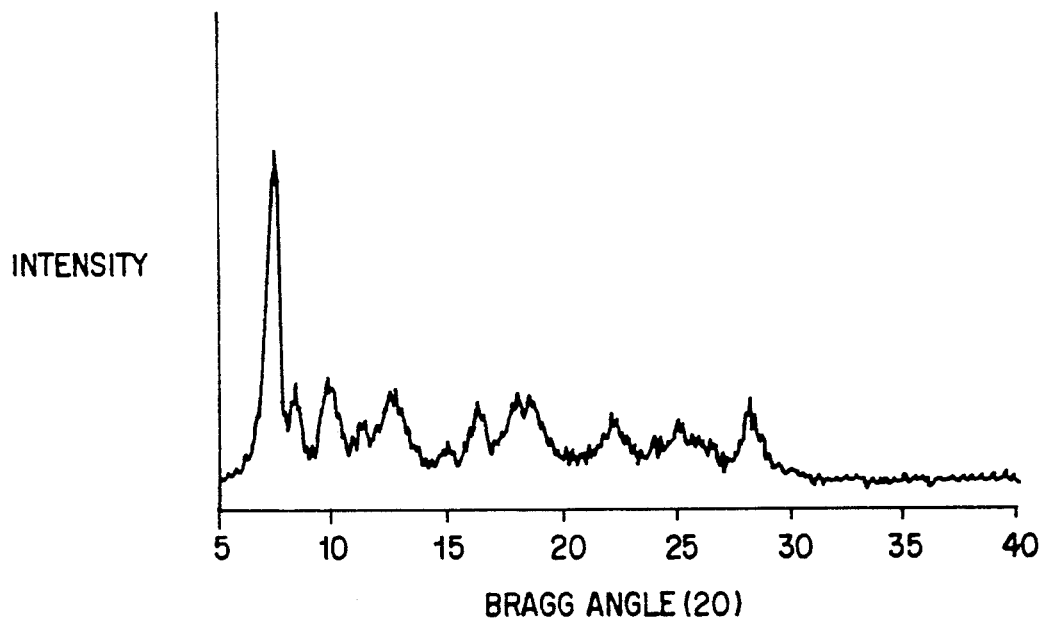
FIG. 13 is a powder X-ray diffraction pattern of hydroxygallium phthalocyanine crystals obtained in Example 5.

The same process as that in Example 1 was repeated, except that the solvent for milling and the washing solvent were replaced by dimethylsulfoxide and n-butyl acetate, respectively, to obtain 0.4 part of hydroxygallium phthalocyanine crystals. FIG. 13 shows the powder X-ray diffraction pattern of the crystals.

EXAMPLE 6

Figure 14:
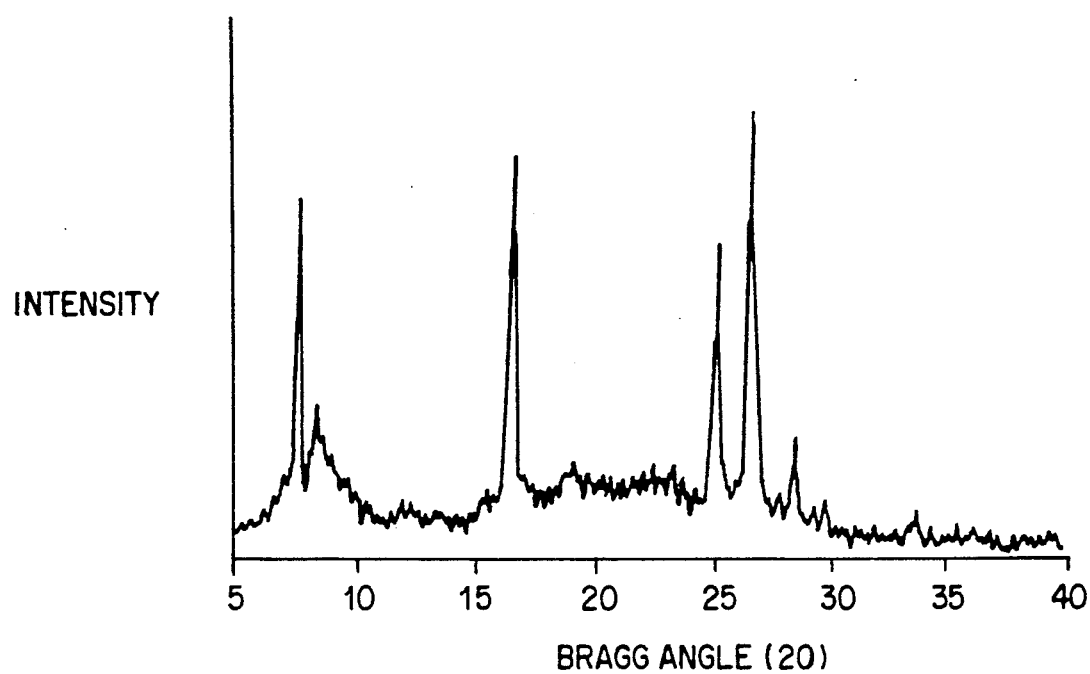
FIG. 14 is a powder X-ray diffraction pattern of hydroxygallium phthalocyanine crystals obtained in Example 6.

0.5 part of the hydroxygallium phthalocyanine crystals as obtained in Synthesis Example 1 were added to 15 parts of chloroform and stirred at room temperature for 17 hours. The crystals were then separated. These were washed with methanol and dried to obtain 0.4 part of hydroxygallium phthalocyanine crystals. FIG. 14 shows the powder X-ray diffraction pattern of the crystals.

EXAMPLE 7

0.5 part of the hydroxygallium phthalocyanine crystals as obtained in Synthesis Example 2 were milled along with 15 parts of methanol and 30 parts of 1 mm-diameter glass beads for 24 hours. Then, the crystals were separated and dried to obtain 0.4 part of hydroxygallium phthalocyanine crystals. The powder X-ray diffraction pattern of the crystals was same as that of FIG. 14.

EXAMPLE 8

Figure 15:
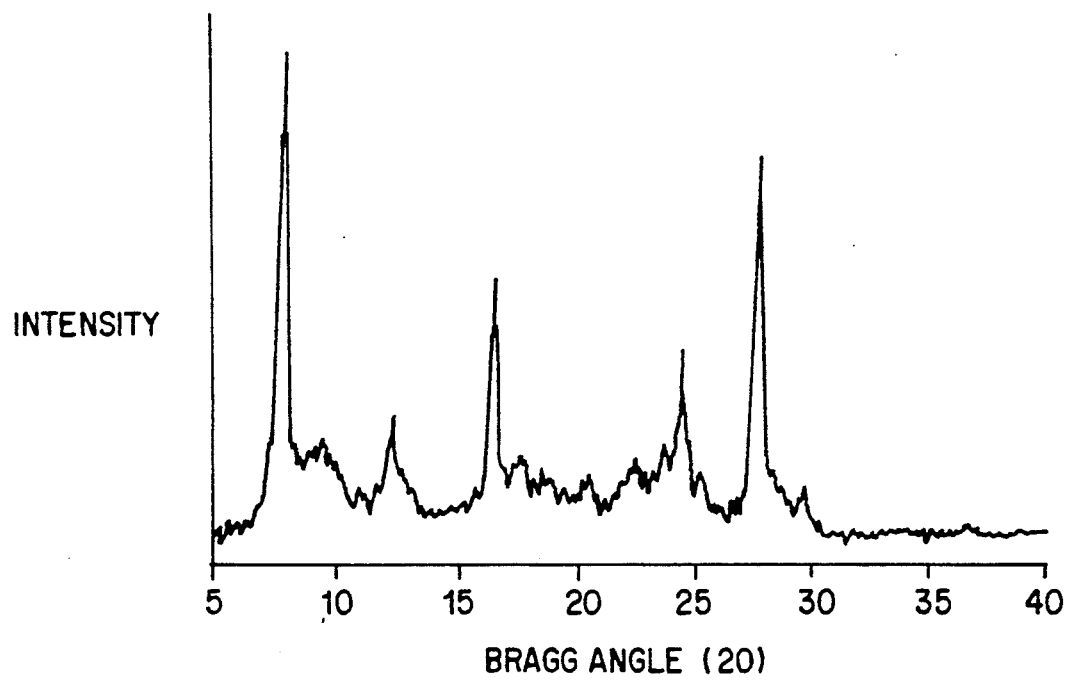
FIG. 15 is a powder X-ray diffraction pattern of hydroxygallium phthalocyanine crystals obtained in Example 8.

0.5 part of the hydroxygallium phthalocyanine crystals as obtained in Synthesis Example 2 were milled along with 15 parts of dimethylsulfoxide and 30 parts of 1 mm-diameter glass beads for 24 hours. Then, the crystals were separated, washed with methanol and dried to obtain 0.4 part of hydroxygallium phthalocyanine crystals. FIG. 15 shows the powder X-ray diffraction pattern of the crystals.

EXAMPLE 9

The same process as that in Example 8 was repeated, except that the solvent for milling was replaced by piperidine, to obtain 0.4 part of hydroxygallium phthalocyanine crystals. The X-ray powder diffraction pattern of the crystals was same as that of FIG. 15.

EXAMPLE 10

Figure 16:
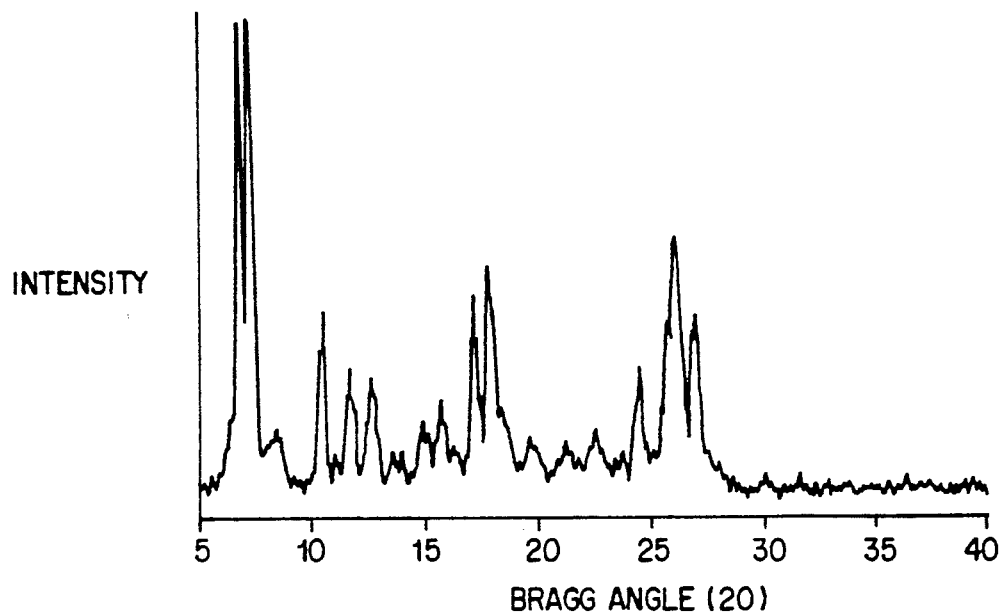
FIG. 16 is a powder X-ray diffraction pattern of hydroxygallium phthalocyanine crystals obtained in Example 10.

The same process as that in Example 8 was repeated, except that the solvent for milling was replaced by benzyl alcohol, to obtain 0.4 part of hydroxygallium phthalocyanine crystals. FIG. 16 shows the powder X-ray diffraction pattern of the crystals.

EXAMPLE 11

Figure 17:
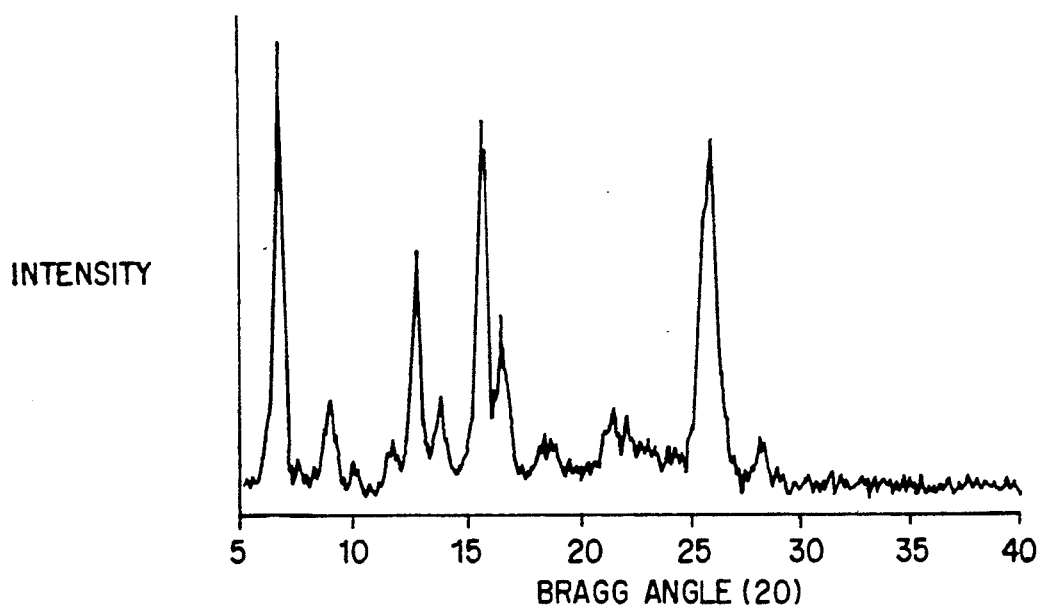
FIG. 17 is a powder X-ray diffraction pattern of hydroxygallium phthalocyanine crystals obtained in Example 11.

0.5 part of the hydroxygallium phthalocyanine crystals as obtained in Synthesis Example 1 were added to 5 parts of ethylene glycol and stirred at 100° C. for 7 hours. Then, the crystal was separated, washed with methanol and dried to obtain 0.4 part of hydroxygallium phthalocyanine crystals. FIG. 17 shows the powder X-ray diffraction pattern of the crystals.

EXAMPLES 12 TO 20

0.1 part of anyone of the hydroxygallium phthalocyanine crystals each having the X-ray diffraction pattern of one of FIG. 8 and FIGS. 10 to 17, respectively, was mixed with one part of polyvinyl butyral (S-Lec BM-S, trade name by Sekisui Chemical Co.) and 10 parts of cyclohexanone, and the mixture was dispersed by treating it in a paint shaker along with glass beads for one hour. The thus obtained coating composition was coated on an aluminium substrate as the electroconductive support by a dip-coating method and dried under heat at 100° C. for 5 minutes to form thereon a charge generating layer having a thickness of 0.2 μm.

Next, one part of N,N'-diphenyl-N,N+-bis-(m-tolyl)-benzidine having the following structural formula (1)

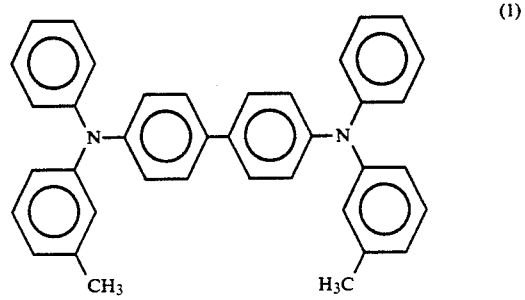

and one part of poly[1,1-di-(p-phenylene)cyclohexane carbonate] having the following structural formula (2):

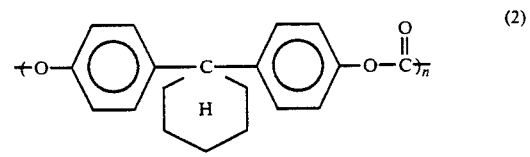

were dissolved in 8 parts of chlorobenzene, and the resulting coating composition was coated over the charge generating layer as formed on the aluminium substrate, by a dip-coating method, and dried at 120° C. for one hour to form thereon a charge transporting layer having a thickness of 20 μm.

The electrophotographic photoreceptor thus prepared was examined with respect to the following electrophotographic characteristics, under a normal temperature and normal humidity condition (20° C., 40% RH), a low temperature and low humidity condition (10° C., 15% RH) and a high temperature and high humidity condition (28° C., 80% RH), using an electrostatic duplicating paper test device (Electrostatic Analyzer EPA-8100 Model, manufactured by Kawaguchi Denki Co.).

$V_{DPP}$: Surface potential in one second after −6.0 KV corona discharge for negative charging.

$E_{\frac{1}{2}}$: A 800 nm spectral light derived from a band pass filter was irradiated, and the exposure amount of the light necessary for lowering the surface potential to ½ of the initial potential was measured to be $E_{\frac{1}{2}}$.

$V_{RP}$: Surface potential after irradiation of a white light of 50 erg/cm² for 0.5 second.

$\Delta E^*_{\frac{1}{2}}$: Amount of environment-dependant fluctuation of $E_{\frac{1}{2}}$ as measured under various ambient conditions.

$\Delta V_{DDP}$: Amount of fluctuation between $V_{DDP}$ after 1,000 times repetition of the above-mentioned charging and exposure and the initial $V_{DDP}$.

$\Delta E_{\frac{1}{2}}$: Amount of fluctuation of $E_{\frac{1}{2}}$ after 1,000 times repetition of the above-mentioned charging and exposure.

$\Delta V_{RP}$: Amount of fluctuation betweenafter $V_{RP}$ after 1,000 times repetition of the above-mentioned charging and exposure and the initial $V_{RP}$.

The results obtained are shown in Table 3 below.

COMPARATIVE EXAMPLE 1

A comparative electrophotographic photoreceptor was prepared in the same manner as in Example 12, except that 0.1 part of the hydroxygallium phthalocyanine crystals obtained in Synthesis Example 1 were used. This was examined to determine the electrophotographic characteristics also in the same manner as above, and the results obtained are shown in Table 3.

to form thereon a charge transporting layer having a thickness of 20 μm.

The electrophotographic photoreceptor thus prepared was examined with respect to the electrophotographic characteristics in the manner mentioned below.

The electrophotographic photoreceptor was subjected to corona discharging of −6 KV so as to be charged under a normal temperature and normal humidity condition (20° C., 40% RH), using an electrostatic duplicating paper test device (Electrostatic Analyzer EPA-8100 Model, manufactured by Kawaguchi Denki Co.). Then an 800-nm monochromatic light as derived from a tungsten lamp with a monochrometer was irradiated to the photoreceptor, the irradiated intensity being adjusted to be 1 μW/cm². The initial surface potential $V_0$ (volt) and the half-value exposure

TABLE 3

| | Charge Generating Layer Crystals Used | Initial Characteristics | | | environment stability | Stability and Durability | | |
|---|---|---|---|---|---|---|---|---|
| Example | | $V_{DDP}$ (V) | $E_{\frac{1}{2}}$ (erg/cm²) | VRP (V) | $\Delta E^*_{\frac{1}{2}}$ (erg/cm²) | $\Delta V_{DDP}$ (V) | $\Delta E_{\frac{1}{2}}$ (erg/cm²) | $\Delta$VRP (V) |
| Example 12 | Example 1 (FIG. 8) | −800 | 2.1 | 20 | 0.1 | 25 | 0.3 | 10 |
| Example 13 | Example 2 (FIG. 10) | −800 | 2.1 | 20 | 0.1 | 25 | 0.3 | 9 |
| Example 14 | Example 3 (FIG. 11) | −790 | 2.2 | 20 | 0.1 | 30 | 0.3 | 10 |
| Example 15 | Example 4 (FIG. 12) | −780 | 2.2 | 25 | 0.1 | 25 | 0.3 | 9 |
| Example 16 | Example 5 (FIG. 13) | −770 | 2.2 | 20 | 0.1 | 25 | 0.3 | 10 |
| Example 17 | Example 6 (FIG. 14) | −830 | 2.5 | 25 | 0.1 | 30 | 0.1 | 10 |
| Example 18 | Example 8 (FIG. 15) | −790 | 2.5 | 20 | 0.1 | 25 | 0.1 | 9 |
| Example 19 | Example 10 (FIG. 16) | −750 | 3.4 | 20 | 0.1 | 30 | 0.1 | 13 |
| Example 20 | Example 11 (FIG. 17) | −830 | 2.8 | 25 | 0.1 | 20 | 0.1 | 11 |
| Comparative Example 1 | Synthesis Example 1 (FIG. 5) | −750 | 4.2 | 25 | 0.2 | 100 | 0.2 | 19 |

EXAMPLE 21

A solution composed of one part of an alcohol-soluble nylon resin (Luckamide L-5003, product by DaiNippon Ink Chemicals Co.) and 10 parts of methanol was coated on an aluminium substrate by a dip coating method and dried under heat at 120° C. for 10 minutes to form a subbing layer having a thickness of 0.5 μm.

One part of the hydroxygallium phthalocyanine crystals as obtained in Example 1 was mixed with one part of a partially acetacetalized polyvinyl butyral resin (S-Lec BX-L, product by Sekisui Chemical Co.) and 100 parts of n-butyl acetate, and the resulting mixture was treated in a paint shaker along with glass beads to form a resin dispersion. The thus obtained coating composition was coated on the subbing layer by a dip coating method and dried under heat at 100° C. for 10 minutes to form a charge generating layer having a thickness of 0.15 μm. It was confirmed that the crystal form of the hydroxygallium phthalocyanine crystals did not change after dispersion by X-ray diffraction.

2 parts of N,N′-diphenyl-N,N′-bis-(m-tolyl)benzidine of formula (1) and 3 parts of poly[1,1-di-(p-phenylene)-cyclohexane carbonate] of formula (2) were dissolved in 20 parts of chlorobenzene, and the coating composition thus obtained was coated over the charge generating layer formed on the aluminium substrate by a dip coating method and dried under heat at 120° C. for one hour amount $E_{\frac{1}{2}}$ (erg/cm²) were measured. Next, a white light of 10 luxes was irradiated to the surface of the photoreceptor for one second, and the residual potential $V_R$ (volt) was measured. Further, the charging and exposure cycle was repeated 1,000 times whereupon $V_0$, $E_{\frac{1}{2}}$ and $V_R$ were measured.

The hydroxygallium phthalocyanine crystals and the binder resin of constituting the charge generating layer 1 and the measured results as well as the fluctuation of the results of $\Delta V_0$, $\Delta E_{\frac{1}{2}}$ and $\Delta V_R$ are shown in Tables 4 and 5, along with those of the following Examples 22 to 27 and Comparative Examples 2 to 4.

EXAMPLE 22

A photoreceptor was prepared in the same manner as in Example 21 except that one part of a partially formalized polyvinyl butyral resin (S-Lec BX-2, product by Sekisui Chemical Co.) was used in place of the partially acetacetalized polyvinyl butyral resin of constituting the charge generating layer. The photoreceptor was examined in the same manner as in Example 21.

EXAMPLE 23

A photoreceptor was prepared in the same manner as in Example 21 except that one part of a polyester resin (Vylon 200, product by Toyo Spinning Co.) was used in place of the partially acetacetalized polyvinyl butyral resin of constituting the charge generating layer. The photoreceptor was examined in the same manner as in Example 21.

EXAMPLE 24

A photoreceptor was prepared in the same manner as in Example 21 except that one part of a polymethyl methacrylate resin (PMMA) (Elbasite 2021, product by DuPont Co.) was used in place of the partially acetacetalized polyvinyl butyral resin of constituting the charge generating layer 1. The photoreceptor was examined in the same manner as in Example 21.

COMPARATIVE EXAMPLE 2

A photoreceptor was prepared in the same manner as in Example 21 except that the hydroxygallium phthalocyanine crystals as obtained in Synthesis Example 1 were used in place of the hydroxygallium phthalocyanine crystals as obtained in Example 1. The photoreceptor was examined in the same manner as in Example 21.

COMPARATIVE EXAMPLE 3

A photoreceptor was prepared in the same manner as in Example 21 except that the hydroxygallium phthalocyanine crystals as obtained in Synthesis Example 2 were used in place of the hydroxygallium phthalocyanine crystals as obtained in Example 1. The photoreceptor was examined in the same manner as in Example 21.

EXAMPLE 25

A solution composed of 10 parts of a zirconium compound (Orgatics ZC540, product by Matsumoto Pharmaceutical Co.), one part of a silane compound (A1110, product by Nippon Unicar Co.), 40 parts of i-propanol and 20 parts of butanol was coated on an aluminium support by a dip coating method and dried under heat at 160° C. for 10 minutes to form a subbing layer having a thickness of 0.1 μm.

One part of the hydroxygallium phthalocyanine crystals as obtained in Example 1 was mixed with one part of a carboxy-modified vinyl chloride-vinyl acetate copolymer (VMCH, product by Union Carbide Co.) and 100 parts of n-butyl acetate and treated in a paint shaker along with glass beads so that the crystals were dispersed in the copolymer solution. The thus obtained coating composition was coated over the subbing layer by a dip coating method and dried at 100° C. for 10 minutes to form thereon a charge generating layer having a thickness of 0.2 μm. It was confirmed that the crystal form of the hydroxygallium phthalocyanine crystals did not change after dispersion by X-ray diffraction.

A charge transporting layer was formed over the charge generating layer in the same manner as in Example 21 except that 2 parts of N,N'-bis-(p-tolyl)-N,N'-bis-(p-ethylphenyl)-3,3'-dimethylbenzidine having the following structural formula (3) was used in place of N,N'-diphenyl-N,N-bis-(m-tolyl)-benzidine of formula (2). The photoreceptor sample prepared was then examined in the same manner as in Example 21.

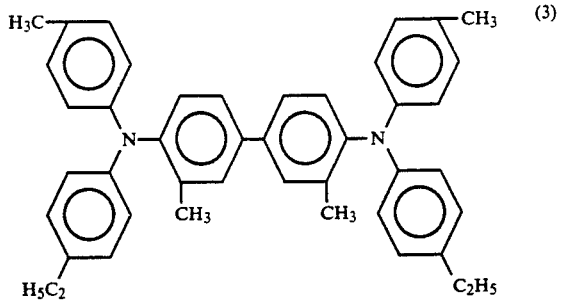

EXAMPLE 26

A photoreceptor was prepared in the same manner as in Example 25 except that one part of a phenoxy resin (PKHH, product by Union Carbide Co.) and 100 parts of cyclohexanone were used in place of the modified vinyl chloride-vinyl acetate copolymer of constituting the charge generating layer 1. The photoreceptor was examined in the same manner as in Example 21.

EXAMPLE 27

A photoreceptor was prepared in the same manner as in Example 25 except that one part of a modified ether type polyester resin (STAFIX NLC-2, product by Fuji Photo Film Co.) and 100 parts of cyclohexanone were used in place of the modified vinyl chloride-vinyl acetate copolymer of constituting the charge generating layer 1. The photoreceptor was examined in the same manner as in Example 21.

COMPARATIVE EXAMPLE 4

A photoreceptor was prepared in the same manner as in Example 25 except that the hydroxygallium phthalocyanine crystals as obtained in Synthesis Example 1 were used in place of the hydroxygallium phthalocyanine crystals as obtained in Example 1. The photoreceptor was examined in the same manner as in Example 21.

TABLE 4

| | Charge Generating Layer | |
|---|---|---|
| Example No. | Crystals Used (X-ray Diffraction Pattern) | Binder Resin Used |
| Example 21 | FIG. 8 | partially acetacetalized polyvinyl butyral |
| Example 22 | FIG. 8 | partially formalized polyvinyl butyral |
| Example 23 | FIG. 8 | polyester |
| Example 24 | FIG. 8 | PMMA |
| Example 25 | FIG. 8 | carboxy-modified vinyl chloride-vinyl acetate copolymer |
| Example 26 | FIG. 8 | phenoxy resin |
| Example 27 | FIG. 8 | modified ether type polyester |
| Comparative Example 2 | FIG. 5 | partially acetacetalized polyvinyl butyral |
| Comparative Example 3 | FIG. 7 | partially acetacetalized polyvinyl butyral |
| Comparative Example 4 | FIG. 5 | carboxy-modified vinyl chloride-vinyl acetate copolymer |

TABLE 5

| | Initial Characteristics | | | Retained Characteristics (after 1,000 repetitions) | | | Stability | Durability | |
|---|---|---|---|---|---|---|---|---|---|
| Example No. | $V_0$ (V) | $E_{\frac{1}{2}}$ (erg/cm$^2$) | $V_{RP}$ (V) | $V_0$ (V) | $E_{\frac{1}{2}}$ (erg/cm$^2$) | $V_{RP}$ (V) | $\Delta E^*_{\frac{1}{2}}$ (erg/cm$^2$) | $\Delta V_0$ (V) | $\Delta V_{RP}$ (V) |
| Example 21 | −815 | 2.2 | −21 | −803 | 2.5 | −26 | 0.3 | 12 | 5 |

TABLE 5-continued

| Example No. | Initial Characteristics | | | Retained Characteristics (after 1,000 repetitions) | | | Stability | Durability | |
|---|---|---|---|---|---|---|---|---|---|
| | $V_0$ (V) | $E_{\frac{1}{2}}$ (erg/cm$^2$) | $V_{RP}$ (V) | $V_0$ (V) | $E_{\frac{1}{2}}$ (erg/cm$^2$) | $V_{RP}$ (V) | $\Delta E^*_{\frac{1}{2}}$ (erg/cm$^2$) | $\Delta V_0$ (V) | $\Delta V_{RP}$ (V) |
| Example 22 | −821 | 2.3 | −18 | −813 | 2.5 | −24 | 0.2 | 8 | 6 |
| Example 23 | −720 | 3.0 | −39 | −656 | 3.9 | −52 | 0.9 | 64 | 13 |
| Example 24 | −729 | 3.4 | −48 | −668 | 4.2 | −63 | 0.8 | 61 | 15 |
| Example 25 | −803 | 1.9 | −15 | −789 | 2.2 | −22 | 0.3 | 14 | 7 |
| Example 26 | −815 | 2.1 | −26 | −803 | 2.3 | −30 | 0.2 | 12 | 4 |
| Example 27 | −821 | 1.9 | −21 | −811 | 2.0 | −25 | 0.1 | 10 | 4 |
| Comparative Example 2 | −742 | 4.3 | −32 | −637 | 5.1 | −49 | 0.8 | 69 | 17 |
| Comparative Example 3 | −723 | 5.2 | −47 | −655 | 6.3 | −63 | 1.1 | 68 | 16 |
| Comparative Example 4 | −724 | 3.7 | −28 | −651 | 4.9 | −42 | 1.2 | 73 | 14 |

EXAMPLES 28 TO 32

Drum type electrophotographic photoreceptors were prepared under the same conditions as those in Examples 21, 22 and 25 to 27. Each of them was set in a semiconductor laser printer (FX XP-15 Model, manufactured by Fuji Xerox Co.) and duplicated images were formed. Duplication was repeated 10,000 times and measured for the property of the CGL coat layer and formation of the image deffects. The results are shown in Table 6 below.

TABLE 6

| Example No. | Property of CGL Coat Layer | Image Defects | |
|---|---|---|---|
| | | One Duplication | 10,000 Duplications |
| Example 28 | Good | No | No |
| Example 29 | Good | No | No |
| Example 30 | Good | No | No |
| Example 31 | Good | No | No |
| Example 32 | Good | No | No |

EXAMPLE 33

Figure 18:
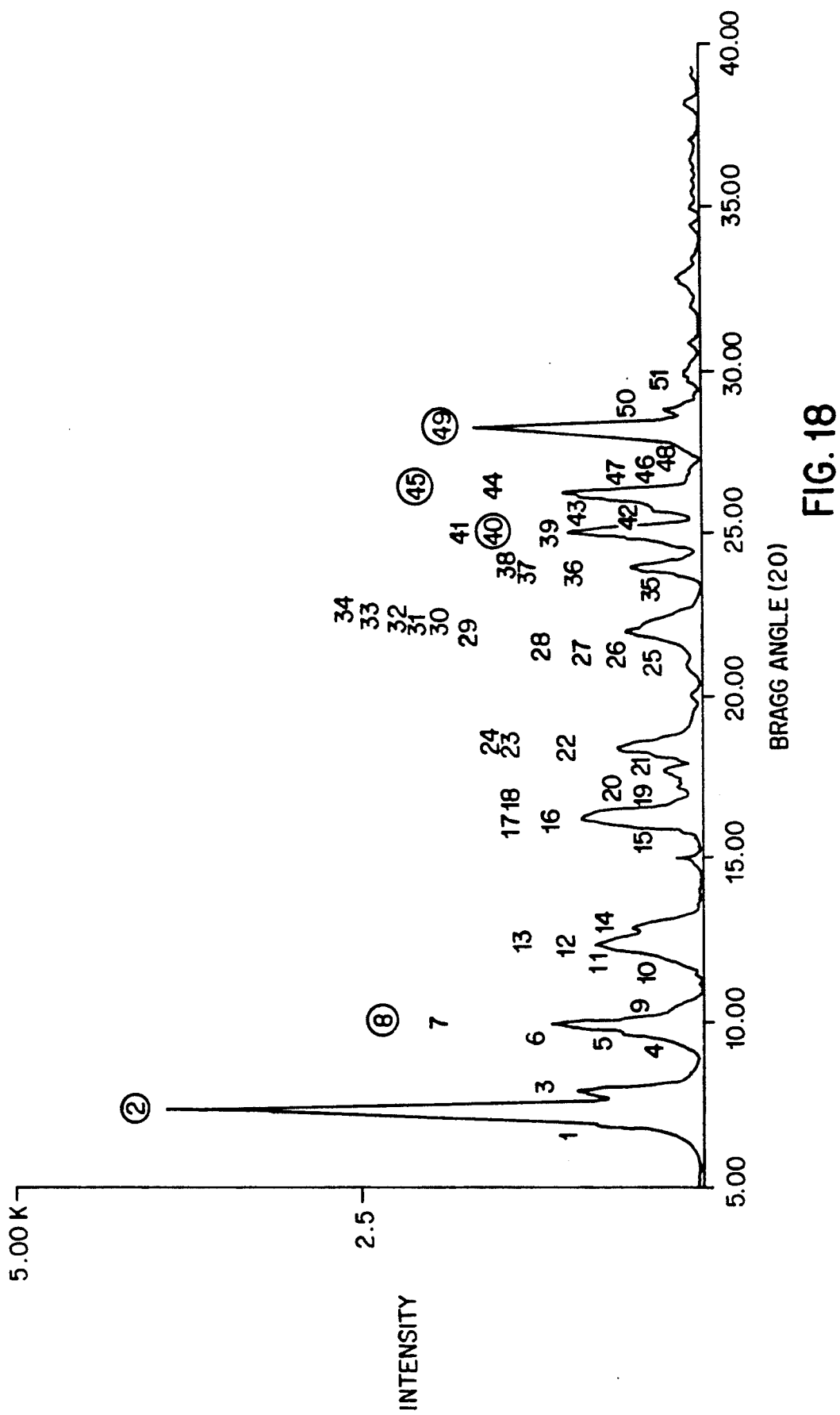
FIG. 18 is a powder X-ray diffraction pattern of hydroxygallium phthalocyanine crystals obtained in Example 33.
Figure 19:
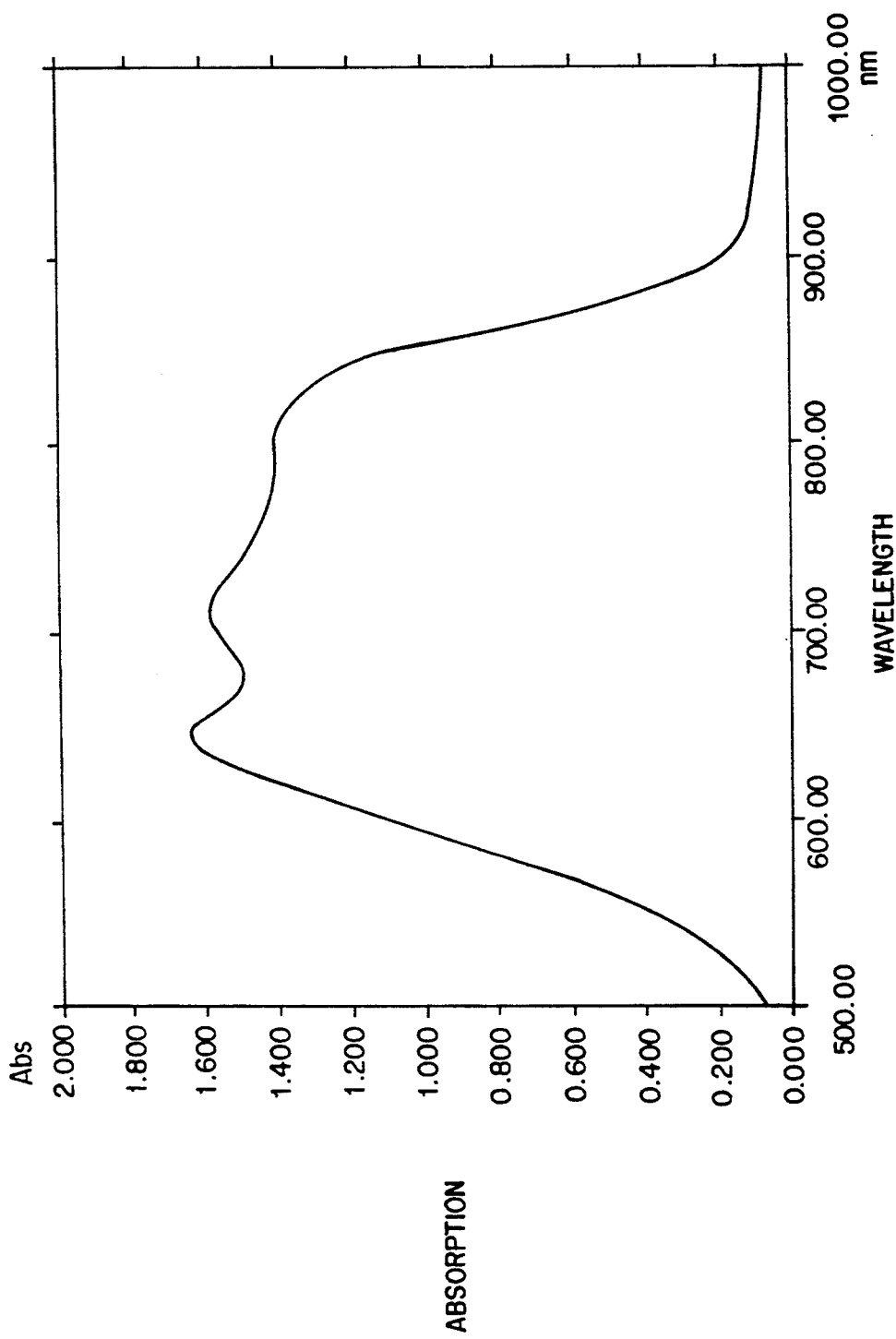
FIG. 19 is a visible-infrared spectrum pattern of hydroxygallium phthalocyanine crystals obtained in Example 33.

One part of the hydroxygallium phthalocyanine crystals as obtained in Synthesis Example 1, having the powder X-ray diffraction pattern of FIG. 5, were milled in an attritor along with 18 parts of dimethylformamide and 200 parts of ⅛ inch-diameter steel shots for 16 hours. The thus milled crystals were separated, washed with n-butyl acetate and dried to obtain 0.9 part of hydroxygallium phthalocyanine crystals. FIG. 18 shows the powder X-ray diffraction pattern of the crystals. FIG. 19 shows the visible infrared absorption spectrum of the crystals.

It can be understood from FIG. 18 that the resulting crystals had distinct diffraction peaks at 7.4°, 9.9°, 25.0°, 26.0° and 28.2° of the Bragg angle (2θ±0.2) in the X-ray diffraction spectrum.

An electrophotographic photoreceptor was prepared in the same manner as in Example 12, except that the above-obtained hydroxygallium phthalocyanine crystals were used. This was examined to determine the electrophotographic characteristics the same manner as in Exmple 12. The results obtained are as follows:

$V_{DDP}$: −810 (V)
$E_{\frac{1}{2}}$: 2.1 (erg/cm$^2$)
$V_{RP}$: 25 (V)
$E^*_{\frac{1}{2}}$: 0.1 erg/cm$^2$)
$\Delta V_{DDP}$: 25 (V)
$\Delta E_{\frac{1}{2}}$: 0.3 (erg/Cm$^2$)
$\Delta V_{RP}$: 10 (V)

As has been explained in detail in the above, the chlorogallium phthalocyanine crystals of the present invention have novel crystal forms and the wavelength range of the light to which they are sensitive is extended to a long wavelength range. Therefore, they are extremely useful as photoconductive materials for electrophotographic photoreceptors such as printers of using semiconductor lasers. The electrophotographic photoreceptors of the present invention having the above-mentioned chlorogallium phthalocyanine crystals with a novel crystal form have high sensitivity and are usable as high-durability photoreceptors, since the residual charge is low, the charging property is high and the fluctuation of the characteristics due to repeated use is small.

In particular, electrophotographic photoreceptors each having a light-sensitive layer comprising hydroxygallium phthalocyanine crystals as a charge generating material and a binder resin selected from polyvinyl acetal resins, vinyl chloride-vinyl acetate copolymers, phenoxy resins and modified ether type polyester resins have high sensitivity and good charge retentiveness and coatability. They may form images having few image defects and having extremely excellent image characteristics.

While the invention has been described in detail and with reference to specific embodiments thereof, it will be apparent to one skilled in the art that various changes and modifications can be made therein without departing from the spirit and scope thereof.

What is claimed is:

1. Hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum.

2. Hydroxygallium phthalocyanine crystals having distinct diffraction peaks at 7.7°, 16.5°, 25.1° and 26.6° of the Bragg angle (2θ±0.2) in the X-ray diffraction spectrum.

3. Hydroxygallium phthalocyanine crystals having distinct diffraction peaks at 7.9°, 16.5°, 24.4° and 27.6° of the Bragg angle (2θ±0.2) in the X-ray diffraction spectrum.

4. Hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle (2θ±0.2) in the X-ray diffraction spectrum.

5. Hydroxygallium phthalocyanine crystals having distinct diffraction peaks at 6.8°, 12.8°, 15.8° and 26.0° of the Bragg angle (2θ±0.2) in the X-ray diffraction spectrum.

6. Hydroxygallium phthalocyanine crystals having distinct diffraction peaks at 7.4°, 9.9°, 25.0° and 26.0° and 28.2° of the Bragg angle (2θ±0.2) in the X-ray diffraction spectrum.

7. A method of preparing hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum, said method comprising treating hydroxygallium phthalocyanine with a solvent containing at least one selected from the group consisting of amides, esters and ketones.

8. The method as claimed in claim 7, wherein said solvent is selected from the group consisting of N,N-dimethylformamide, N,N-dimethylacetamide, ethyl acetate, n-butyl acetate and methyl ethyl ketone.

9. A photoconductive material for electrophotographic photoreceptor comprising at least one of (a) hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum; (b) hydroxygallium phthalocyanine crystals having distinct diffraction peaks at 7.7°, 16.5°, 25.1° and 26.6° of the Bragg angle (2θ±0.2) in the X-ray diffraction spectrum; (c) hydroxygallium phthalocyanine crystals having distinct diffraction peaks at 7.9°, 16.5°, 24.4° and 27.6° of the Bragg angle (2θ±0.2) in the X-ray diffraction spectrum; (d) hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle (2θ±0.2) in the X-ray diffraction spectrum; (e) hydroxygallium phthalocyanine crystals having distinct diffraction peaks at 6.8°, 12.8°, 15.8° and 26.0° of the Bragg angle (2θ±0.2) in the X-ray diffraction spectrum; and (f) hydroxygallium phthalocyanine crystals having distinct diffraction peaks at 7.4°, 9.9°, 25.0°, 26.0° and 28.2° of the Bragg angle (2θ±0.2) in the X-ray diffraction spectrum.

10. An electrophotographic photoreceptor comprising an electroconductive support having thereon a light-sensitive layer containing at least one of (a) hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum; (b) hydroxygallium phthalocyanine crystals having distinct diffraction peaks at 7.7°, 16.5°, 25.1° and 26.6° of the Bragg angle (2θ±0.2) in the X-ray diffraction spectrum; (c) hydroxygallium phthalocyanine crystals having distinct diffraction peaks at 7.9°, 16.5°, 24.4° and 27.6° of the Bragg angle (2θ±0.2) in the X-ray diffraction spectrum; (d) hydroxygallium phthalocyanine crystals having distinct diffraction peaks at 7.0°, 7.5°, 10.5°, 11.7°, 12.7°, 17.3°, 18.1°, 24.5°, 26.2° and 27.1° of the Bragg angle (2θ±0.2) in the X-ray diffraction spectrum; (e) hydroxygallium phthalocyanine crystals having distinct diffraction peaks at 6.8°, 12.8°, 15.8° and 26.0° of the Bragg angle (2θ±0.2) in the X-ray diffraction spectrum; and (f) hydroxygallium phthalocyanine crystals having distinct diffraction peaks at 7.4°, 9.9°, 25.0°, 26.0° and 28.2° of the Bragg angle (2θ±0.2) in the X-ray diffraction spectrum.

11. An electrophotographic photoreceptor as claimed in claim 10, wherein said light-sensitive layer contains (a) hydroxygallium phthalocyanine crystals having distinct diffraction peaks at 7.5°, 9.9°, 12.5°, 16.3°, 18.6°, 25.1° and 28.3° of the Bragg angle (2θ±0.2) in the X-ray diffraction spectrum.

12. An electrophotographic photoreceptor as claimed in claim 10, wherein said light-sensitive layer contains at least one of a polyvinyl acetal resin, a vinyl chloride-vinyl acetate copolymer, a phenoxy resin and a modified ether type polyester resin as a binder resin.

13. An electrophotographic photoreceptor as claimed in claim 12, wherein said light-sensitive layer contains a polyvinyl acetal resin selected from a polyvinyl butyral resin, a polyvinyl formal resin and a partially acetallized polyvinyl butyral resin.

14. An electrophotographic photoreceptor as claimed in claim 12, wherein said light-sensitive layer contains a vinyl chloride-vinyl acetate copolymer selected from a vinyl chloride-vinyl acetate copolymer, a hydroxyl-modified vinyl chloride-vinyl acetate copolymer and a carboxyl-modified vinyl chloride-vinyl acetate copolymers.

15. An electrophotographic photoreceptor as claimed in claim 12, wherein the light-sensitive layer has a laminate structure comprising a charge generating layer and a charge transporting layer as laminated in this order on said support, and said charge generating layer contains at least one of said hydroxygallium phthalocyanine crystals (a) to (e) and said binder resin.

16. Hydroxygallium phthalocyanine crystals having distinct diffraction peaks at degrees of the Bragg angle (2θ±0.2) in the X-ray diffraction spectrum prepared by treating hydroxygallium phthalocyanine with a solvent selected from the group consisting of amides, ketones, alcohols, amines, aromatic alcohols and polyhydric alcohols.

17. Hydroxygallium phthalocyanine crystals of claim 16, having distinct diffraction peaks at 7.5°, 9.9°, 12.5°, 16.3°, 18.6°, 25.1° and 28.3° of the Bragg angle (2θ±0.2) in the X-ray diffraction spectrum.

18. Hydroxygallium phthalocyanine crystals of claim 16, having distinct diffraction peaks at 7.7°, 16.5°, 25.1° and 26.6° of the Bragg angle (2θ±0.2) in the X-ray diffraction spectrum.

19. Hydroxygallium phthalocyanine crystals of claim 16, having distinct diffraction peaks at 7.9°, 16.5°, 24.4° and 27.6° of the Bragg angle (2θ±0.2) in the X-ray diffraction spectrum.

20. Hydroxygallium phthalocyanine crystals of claim 16, having distinct diffraction peaks at 7.0°, 7.5°, 10.5°, 11.7°, 12.7°, 17.3°, 18.1°, 24.5°, 26.2° and 27.1° of the Bragg angle (2θ±0.2) in the X-ray diffraction spectrum.

21. Hydroxygallium phthalocyanine crystals of claim 16, having distinct diffraction peaks at 6.8°, 12.8°, 15.8° and 26.0° of the Bragg angle (2θ±0.2) in the X-ray diffraction spectrum.

22. Hydroxygallium phthalocyanine crystals of claim 16, having distinct diffraction peaks at 7.4°, 9.9°, 25.0° and 28.2° of the Bragg angle (2θ±0.2) in the X-ray diffraction spectrum prepared by treating hydroxygallium phthalocyanine with a solvent selected from the group consisting of amides, esters and ketones.

23. Hydroxygallium phthalocyanine crystals of claim 16, wherein said solvent is selected from the group consisting of N,N-dimethylformamide, N,N-dimethylacetamide, ethyl acetate, n-butyl acetate and methyl ethyl ketone.

* * * * *